US011738670B2

(12) United States Patent
Lee et al.

(10) Patent No.: US 11,738,670 B2
(45) Date of Patent: Aug. 29, 2023

(54) VEHICLE SEATING SYSTEMS

(71) Applicant: Canoo Technologies Inc., Torrance, CA (US)

(72) Inventors: Gareth Lee, Torrance, CA (US); Scott Anderson, Torrance, CA (US); Sohel Merchant, Rolling Hills Estates, CA (US); Clint Semler, Torrance, CA (US); Richard Kim, Los Angeles, CA (US)

(73) Assignee: Canoo Technologies Inc., Torrance, CA (US)

( * ) Notice: Subject to any disclaimer, the term of this patent is extended or adjusted under 35 U.S.C. 154(b) by 0 days.

(21) Appl. No.: 18/052,460

(22) Filed: Nov. 3, 2022

(65) Prior Publication Data
US 2023/0089091 A1 Mar. 23, 2023

Related U.S. Application Data

(62) Division of application No. 17/027,600, filed on Sep. 21, 2020, now Pat. No. 11,607,977.

(Continued)

(51) Int. Cl.
B60N 2/30 (2006.01)
B60N 2/75 (2018.01)
(Continued)

(52) U.S. Cl.
CPC ............ *B60N 2/3011* (2013.01); *B60N 2/002* (2013.01); *B60N 2/01* (2013.01); *B60N 2/07* (2013.01);
(Continued)

(58) Field of Classification Search
CPC ...... B60N 2/3011; B60N 2/761; B60N 2/002; B60N 2/01; B60N 2/07; B60N 2/0881; B60N 2/165; B60N 2/1665
(Continued)

(56) References Cited

U.S. PATENT DOCUMENTS 1,526,481 A 2/1925 Krieger
2,873,994 A 2/1959 Omps
(Continued)

FOREIGN PATENT DOCUMENTS

AU 2002323246 A1 3/2003
AU 2002332561 A1 3/2003
(Continued)

OTHER PUBLICATIONS

International Search Report and Written Opinion for International Patent Application No. PCT/US2020/050013 dated Nov. 30, 2020, 10 pages.
(Continued)

*Primary Examiner* — Mark R Wendell

(57) ABSTRACT

A side facing seat includes a seat back element and a moveable seat base element disposed below the seat back element. The moveable seat base element is moveable at least between a stored position and a seating position. Movement of the moveable seat base element is controlled by an activation element that is configured to engage with a locking mechanism such that the locking mechanism is able to lock the moveable seat base element in the stored position or the seating position.

24 Claims, 19 Drawing Sheets

Related U.S. Application Data

(60) Provisional application No. 62/903,715, filed on Sep. 20, 2019.

(51) Int. Cl.
*B60N 2/00* (2006.01)
*B60N 2/16* (2006.01)
*B60N 2/07* (2006.01)
*B60N 2/08* (2006.01)
*B60N 2/01* (2006.01)

(52) U.S. Cl.
CPC ........... *B60N 2/0881* (2013.01); *B60N 2/165* (2013.01); *B60N 2/1665* (2013.01); *B60N 2/767* (2018.02)

(58) Field of Classification Search
USPC ...................................................... 296/65.01
See application file for complete search history.

(56) References Cited

U.S. PATENT DOCUMENTS

| | | | |
|---|---|---|---|
| 3,170,682 A | 2/1965 | Eggers | |
| 3,429,566 A | 2/1969 | Rosendale | |
| 3,951,450 A | 4/1976 | Gambotti | |
| 4,148,505 A | 4/1979 | Jensen et al. | |
| 4,307,865 A | 12/1981 | MacCready | |
| 4,460,215 A | 7/1984 | Chamberlain et al. | |
| 4,527,828 A * | 7/1985 | Groce | B60N 2/3043 297/14 |
| 4,541,654 A | 9/1985 | Jonasson | |
| 4,557,500 A | 12/1985 | Collard et al. | |
| 4,619,466 A | 10/1986 | Schaible et al. | |
| 4,779,917 A | 10/1988 | Campbell et al. | |
| 4,799,632 A | 1/1989 | Baymak et al. | |
| 4,887,841 A | 12/1989 | Cowburn et al. | |
| 5,015,545 A | 5/1991 | Brooks | |
| 5,039,124 A | 8/1991 | Widmer | |
| 5,069,306 A | 12/1991 | Inoue et al. | |
| 5,141,209 A | 8/1992 | Sano et al. | |
| 5,501,289 A | 3/1996 | Nishikawa et al. | |
| 5,807,205 A | 9/1998 | Odaka et al. | |
| 5,827,149 A | 10/1998 | Sponable | |
| 6,029,987 A | 2/2000 | Hoffman et al. | |
| 6,512,347 B1 | 1/2003 | Hellmann et al. | |
| 6,672,662 B1 | 1/2004 | Balk | |
| 6,688,586 B1 | 2/2004 | Moore | |
| 6,705,668 B1 | 3/2004 | Makita et al. | |
| 6,710,916 B1 | 3/2004 | Bolshtyansky | |
| 6,712,164 B2 | 3/2004 | Chernoff et al. | |
| 6,726,438 B2 | 4/2004 | Chernoff et al. | |
| 6,766,873 B2 | 7/2004 | Chernoff et al. | |
| 6,768,932 B2 | 7/2004 | Claypole et al. | |
| 6,811,169 B2 | 11/2004 | Schroeder et al. | |
| 6,830,117 B2 | 12/2004 | Chernoff et al. | |
| 6,836,943 B2 | 1/2005 | Chernoff et al. | |
| 6,843,336 B2 | 1/2005 | Chernoff et al. | |
| 6,845,839 B2 | 1/2005 | Chernoff et al. | |
| 6,857,498 B2 | 2/2005 | Vitale et al. | |
| 6,880,856 B2 | 4/2005 | Chernoff et al. | |
| 6,889,785 B2 | 5/2005 | Chernoff et al. | |
| 6,899,194 B2 | 5/2005 | Chernoff et al. | |
| 6,905,138 B2 | 6/2005 | Borroni-Bird et al. | |
| 6,923,281 B2 | 8/2005 | Chernoff et al. | |
| 6,923,282 B2 | 8/2005 | Chernoff et al. | |
| 6,935,449 B2 | 8/2005 | Chernoff et al. | |
| 6,935,658 B2 | 8/2005 | Chernoff et al. | |
| 6,938,712 B2 | 9/2005 | Chernoff et al. | |
| 6,948,226 B2 | 9/2005 | Chernoff et al. | |
| 6,959,475 B2 | 11/2005 | Chernoff et al. | |
| 6,968,918 B2 | 11/2005 | Chernoff et al. | |
| 6,976,307 B2 | 12/2005 | Chernoff et al. | |
| 6,986,401 B2 | 1/2006 | Chernoff et al. | |
| 6,991,060 B2 | 1/2006 | Chernoff et al. | |
| 7,000,318 B2 | 2/2006 | Chernoff et al. | |
| 7,004,502 B2 | 2/2006 | Borroni-Bird et al. | |
| 7,028,791 B2 | 4/2006 | Chernoff et al. | |
| 7,029,017 B2 | 4/2006 | Zandbergen et al. | |
| 7,036,848 B2 | 5/2006 | Chernoff et al. | |
| 7,083,016 B2 | 8/2006 | Chernoff et al. | |
| 7,096,986 B2 | 8/2006 | Borroni-Bird et al. | |
| 7,104,581 B2 | 9/2006 | Chernoff et al. | |
| 7,111,900 B2 | 9/2006 | Chernoff et al. | |
| 7,213,673 B2 | 5/2007 | Shabana et al. | |
| 7,275,609 B2 | 10/2007 | Chernoff et al. | |
| 7,281,600 B2 | 10/2007 | Chernoff et al. | |
| 7,292,992 B2 | 11/2007 | Chernoff et al. | |
| 7,303,033 B2 | 12/2007 | Chernoff et al. | |
| 7,303,211 B2 | 12/2007 | Borroni-Bird et al. | |
| 7,360,816 B2 | 4/2008 | Chernoff et al. | |
| 7,370,886 B2 | 5/2008 | Luttinen et al. | |
| 7,373,315 B2 | 5/2008 | Chernoff et al. | |
| 7,398,846 B2 | 7/2008 | Young et al. | |
| 7,441,615 B2 | 10/2008 | Borroni-Bird et al. | |
| 7,469,956 B2 | 12/2008 | Yasuhara et al. | |
| 7,520,355 B2 | 4/2009 | Chaney | |
| 7,597,169 B2 | 10/2009 | Borroni-Bird et al. | |
| 7,681,943 B2 | 3/2010 | Murata et al. | |
| 7,753,428 B2 * | 7/2010 | Kato | B60N 2/3011 296/65.09 |
| 7,936,113 B2 | 5/2011 | Namuduri et al. | |
| 8,143,766 B2 | 3/2012 | Namuduri et al. | |
| 8,253,281 B2 | 8/2012 | Namuduri et al. | |
| 8,308,148 B2 | 11/2012 | Shand | |
| 8,448,696 B2 | 5/2013 | Johnston et al. | |
| 8,485,543 B2 | 7/2013 | Richardson et al. | |
| 8,556,282 B2 | 10/2013 | Pollmeyer et al. | |
| 8,640,806 B2 | 2/2014 | Worup et al. | |
| 8,708,392 B2 * | 4/2014 | Otsuka | B60N 2/3011 296/65.05 |
| 8,757,719 B2 * | 6/2014 | Hayakawa | B60N 2/3043 297/331 |
| 8,881,883 B2 | 11/2014 | Barton et al. | |
| 8,936,265 B2 | 1/2015 | Ehrlich et al. | |
| 8,940,425 B2 | 1/2015 | Toepfer | |
| 9,162,546 B2 | 10/2015 | Girelli Consolaro et al. | |
| 9,566,840 B2 | 2/2017 | Seethaler et al. | |
| 9,580,176 B2 | 2/2017 | Ehlers et al. | |
| 9,627,721 B2 | 4/2017 | Kosaki et al. | |
| 9,676,418 B1 | 6/2017 | Mohammed et al. | |
| 9,682,727 B2 | 6/2017 | Tanaka et al. | |
| 9,751,565 B2 | 9/2017 | Tatsuwaki et al. | |
| 9,988,100 B2 | 6/2018 | Kim et al. | |
| 10,131,381 B2 | 11/2018 | Ashraf et al. | |
| 10,293,860 B1 | 5/2019 | Cooper et al. | |
| 10,336,369 B2 | 7/2019 | Viaux et al. | |
| 10,486,513 B2 | 11/2019 | Battaglia et al. | |
| 10,632,857 B2 | 4/2020 | Matecki et al. | |
| 10,741,809 B2 | 8/2020 | Kim et al. | |
| 2002/0149490 A1 | 10/2002 | Butler et al. | |
| 2003/0037427 A1 | 2/2003 | Chernoff et al. | |
| 2003/0037967 A1 | 2/2003 | Chernoff et al. | |
| 2003/0037968 A1 | 2/2003 | Chernoff et al. | |
| 2003/0037970 A1 | 2/2003 | Chernoff et al. | |
| 2003/0037971 A1 | 2/2003 | Chernoff et al. | |
| 2003/0037972 A1 | 2/2003 | Chernoff et al. | |
| 2003/0037973 A1 | 2/2003 | Chernoff et al. | |
| 2003/0037974 A1 | 2/2003 | Chernoff et al. | |
| 2003/0037975 A1 | 2/2003 | Chernoff et al. | |
| 2003/0037982 A1 | 2/2003 | Chernoff et al. | |
| 2003/0037987 A1 | 2/2003 | Chernoff et al. | |
| 2003/0038442 A1 | 2/2003 | Chernoff et al. | |
| 2003/0038467 A1 | 2/2003 | Chernoff et al. | |
| 2003/0038468 A1 | 2/2003 | Chernoff et al. | |
| 2003/0038469 A1 | 2/2003 | Chernoff et al. | |
| 2003/0038470 A1 | 2/2003 | Chernoff et al. | |
| 2003/0038509 A1 | 2/2003 | Chernoff et al. | |
| 2003/0040827 A1 | 2/2003 | Chernoff et al. | |
| 2003/0040828 A1 | 2/2003 | Chernoff et al. | |
| 2003/0040933 A1 | 2/2003 | Chernoff et al. | |
| 2003/0040977 A1 | 2/2003 | Chernoff et al. | |
| 2003/0040979 A1 | 2/2003 | Borroni-Bird et al. | |
| 2003/0046802 A1 | 3/2003 | Chernoff et al. | |

(56) References Cited

U.S. PATENT DOCUMENTS

| | | |
|---|---|---|
| 2003/0047362 A1 | 3/2003 | Chernoff et al. |
| 2003/0080577 A1* | 5/2003 | Roberts ............... B60N 2/3011 |
| | | 296/65.09 |
| 2003/0089536 A1 | 5/2003 | Chernoff et al. |
| 2003/0094318 A1 | 5/2003 | Chernoff et al. |
| 2003/0094319 A1 | 5/2003 | Chernoff et al. |
| 2003/0094320 A1 | 5/2003 | Chernoff et al. |
| 2003/0116374 A1 | 6/2003 | Chernoff et al. |
| 2003/0141736 A1 | 7/2003 | Chernoff et al. |
| 2003/0159866 A1 | 8/2003 | Claypole et al. |
| 2003/0164255 A1 | 9/2003 | Borroni-Bird et al. |
| 2003/0168267 A1 | 9/2003 | Borroni-Bird et al. |
| 2003/0168844 A1 | 9/2003 | Borroni-Bird et al. |
| 2004/0060750 A1 | 4/2004 | Chernoff et al. |
| 2004/0066025 A1 | 4/2004 | Borroni-Bird et al. |
| 2004/0069545 A1 | 4/2004 | Chernoff et al. |
| 2004/0069556 A1 | 4/2004 | Chernoff et al. |
| 2004/0129487 A1 | 7/2004 | Shabana et al. |
| 2004/0163859 A1 | 8/2004 | Chernoff et al. |
| 2004/0163875 A1 | 8/2004 | Chernoff et al. |
| 2004/0164577 A1 | 8/2004 | Shabana et al. |
| 2004/0189054 A1 | 9/2004 | Chernoff et al. |
| 2004/0194280 A1 | 10/2004 | Borroni-Bird et al. |
| 2004/0194313 A1 | 10/2004 | Chernoff et al. |
| 2004/0195014 A1 | 10/2004 | Chernoff et al. |
| 2005/0049944 A1 | 3/2005 | Chernoff et al. |
| 2005/0082872 A1 | 4/2005 | Rich et al. |
| 2005/0161981 A1 | 7/2005 | Chernoff et al. |
| 2005/0168016 A1 | 8/2005 | Svartvatn |
| 2005/0263332 A1 | 12/2005 | Chernoff et al. |
| 2006/0027406 A1 | 2/2006 | Borroni-Bird et al. |
| 2006/0048994 A1 | 3/2006 | Young et al. |
| 2006/0061080 A1 | 3/2006 | Luttinen et al. |
| 2006/0102398 A1 | 5/2006 | Mizuno |
| 2007/0222251 A1 | 9/2007 | Abraham |
| 2008/0169671 A1 | 7/2008 | Hedderly |
| 2009/0058134 A1 | 3/2009 | Hiraishi et al. |
| 2009/0236877 A1 | 9/2009 | Peschansky et al. |
| 2010/0219720 A1 | 9/2010 | Namuduri et al. |
| 2010/0219721 A1 | 9/2010 | Namuduri et al. |
| 2010/0219798 A1 | 9/2010 | Namuduri et al. |
| 2010/0273411 A1 | 10/2010 | Kakizaki et al. |
| 2011/0212355 A1 | 9/2011 | Essinger et al. |
| 2011/0259657 A1 | 10/2011 | Fuechtner |
| 2012/0169089 A1 | 7/2012 | Rawlinson et al. |
| 2012/0175899 A1 | 7/2012 | Gadhiya et al. |
| 2013/0088045 A1 | 4/2013 | Charbonneau et al. |
| 2013/0300138 A1 | 11/2013 | Banasiak et al. |
| 2013/0341882 A1 | 12/2013 | Ehrlich et al. |
| 2014/0308551 A1 | 10/2014 | Schroeder et al. |
| 2014/0353937 A1 | 12/2014 | Girelli Consolaro et al. |
| 2015/0142245 A1 | 5/2015 | Cuddihy et al. |
| 2015/0258955 A1* | 9/2015 | Jayasuriya ............... B60R 22/26 |
| | | 297/353 |
| 2015/0298741 A1 | 10/2015 | Winberg et al. |
| 2016/0164055 A1 | 6/2016 | Saitou |
| 2016/0318409 A1 | 11/2016 | Rawlinson |
| 2017/0001507 A1 | 1/2017 | Ashraf et al. |
| 2017/0001667 A1 | 1/2017 | Ashraf et al. |
| 2017/0057546 A1 | 3/2017 | Dressel et al. |
| 2017/0225588 A1 | 8/2017 | Newman |
| 2017/0225714 A1 | 8/2017 | Ito |
| 2017/0305248 A1 | 10/2017 | Hara et al. |
| 2017/0369112 A1 | 12/2017 | Ashraf et al. |
| 2018/0050606 A1 | 2/2018 | Sugitate et al. |
| 2018/0065678 A1 | 3/2018 | Tutzer |
| 2018/0072131 A1 | 3/2018 | Lee et al. |
| 2018/0097265 A1 | 4/2018 | Tarlau et al. |
| 2018/0108891 A1 | 4/2018 | Fees et al. |
| 2018/0215245 A1 | 8/2018 | Sudhindra et al. |
| 2018/0229628 A1 | 8/2018 | Minato et al. |
| 2018/0261899 A1 | 9/2018 | Milton et al. |
| 2018/0337378 A1 | 11/2018 | Stephens et al. |
| 2018/0361819 A1 | 12/2018 | Ryu et al. |
| 2019/0023321 A1 | 1/2019 | Ayukawa |
| 2019/0092113 A1 | 3/2019 | Girelli Consolaro et al. |
| 2019/0131602 A1 | 5/2019 | Hilfrich et al. |
| 2019/0135065 A1 | 5/2019 | Wolf-Monheim |
| 2019/0210470 A1 | 7/2019 | Thomas et al. |
| 2020/0079431 A1 | 3/2020 | Stainer et al. |
| 2020/0156486 A1 | 5/2020 | Howard et al. |
| 2020/0215943 A1* | 7/2020 | Hayashi ............... B60N 3/004 |
| 2020/0339197 A1 | 10/2020 | Kecalevic et al. |
| 2020/0369140 A1 | 11/2020 | McCarron et al. |
| 2020/0398732 A1 | 12/2020 | Glatfelter et al. |
| 2021/0091352 A1 | 3/2021 | Weicker et al. |
| 2021/0122223 A1 | 4/2021 | McCarron et al. |

FOREIGN PATENT DOCUMENTS

| | | |
|---|---|---|
| CN | 1695050 A | 11/2005 |
| CN | 1791519 A | 6/2006 |
| CN | 100379612 C | 4/2008 |
| CN | 103183053 B | 7/2013 |
| DE | 10154353 A1 | 5/2002 |
| DE | 10297137 T5 | 8/2004 |
| DE | 10297133 B4 | 5/2013 |
| DE | 102018123357 A1 | 3/2019 |
| DE | 102018122854 A1 | 3/2020 |
| DE | 102020101867 A1 | 7/2020 |
| EP | 0770517 A1 | 5/1997 |
| EP | 0857590 A1 | 8/1998 |
| EP | 1245436 A1 | 10/2002 |
| EP | 1446645 A2 | 8/2004 |
| EP | 1448969 A1 | 8/2004 |
| FR | 2821046 A1 | 8/2002 |
| JP | 2005500940 A | 1/2005 |
| JP | 2017001441 A | 1/2017 |
| WO | 2003018337 A2 | 3/2003 |
| WO | 2003018358 A2 | 3/2003 |
| WO | 2003018359 A2 | 3/2003 |
| WO | 2003018373 A1 | 3/2003 |
| WO | 2003019309 A1 | 3/2003 |
| WO | 2003050498 A1 | 6/2003 |
| WO | 2003054500 A2 | 7/2003 |
| WO | 2005084985 A1 | 9/2005 |
| WO | 2006029415 A2 | 3/2006 |
| WO | 2015151064 A1 | 10/2015 |
| WO | 2017136351 A2 | 8/2017 |
| WO | 2017207125 A1 | 12/2017 |
| WO | 2020236913 A1 | 11/2020 |
| WO | 2021050605 A1 | 3/2021 |
| WO | 2021055980 A1 | 3/2021 |

OTHER PUBLICATIONS

International Search Report and Written Opinion for International Patent Application No. PCT/US2020/051870 dated Feb. 4, 2021, 13 pages.

International Search Report and Written Opinion for International Patent Application No. PCT/US2020/051505 dated Feb. 5, 2021, 12 pages.

International Search Report and Written Opinion for International Patent Application No. PCT/US2020/033769 dated Sep. 2, 2020, 30 pages.

International Search Report and Written Opinion for International Patent Application No. PCT/US2020/051879 dated Dec. 14, 2020, 8 pages.

International Search Report and Written Opinion for International Patent Application No. PCT/US2020/040788 dated Dec. 22, 2020, 14 pages.

Non-Final Office Action for U.S. Appl. No. 17/027,626 dated Jul. 20, 2021, 20 pages.

Notice of Allowance for U.S. Appl. No. 17/142,889 dated Jul. 1, 2021, 7 pages.

Cropley, "Williams reveals electric vehicle skateboard chassis," Autocar Industry News, Haymarket Media Group, Sep. 2017, 5 pages.

Notice of Allowance for U.S. Appl. No. 17/027,626, dated Sep. 28, 2021, 7 pages.

(56) References Cited

OTHER PUBLICATIONS

Notice of Allowance for U.S. Appl. No. 16/920,375, dated Dec. 17, 2021, 9 pages.
Notice of Allowance for U.S. Appl. No. 17/491,217, dated Nov. 29, 2021, 10 pages.
Final Office Action dated Aug. 4, 2022, in connection with U.S. Appl. No. 16/879,235, 12 pages.
Non-Final Office Action dated Jun. 7, 2022, in connection with U.S. Appl. No. 16/879,235, 14 pages.

* cited by examiner

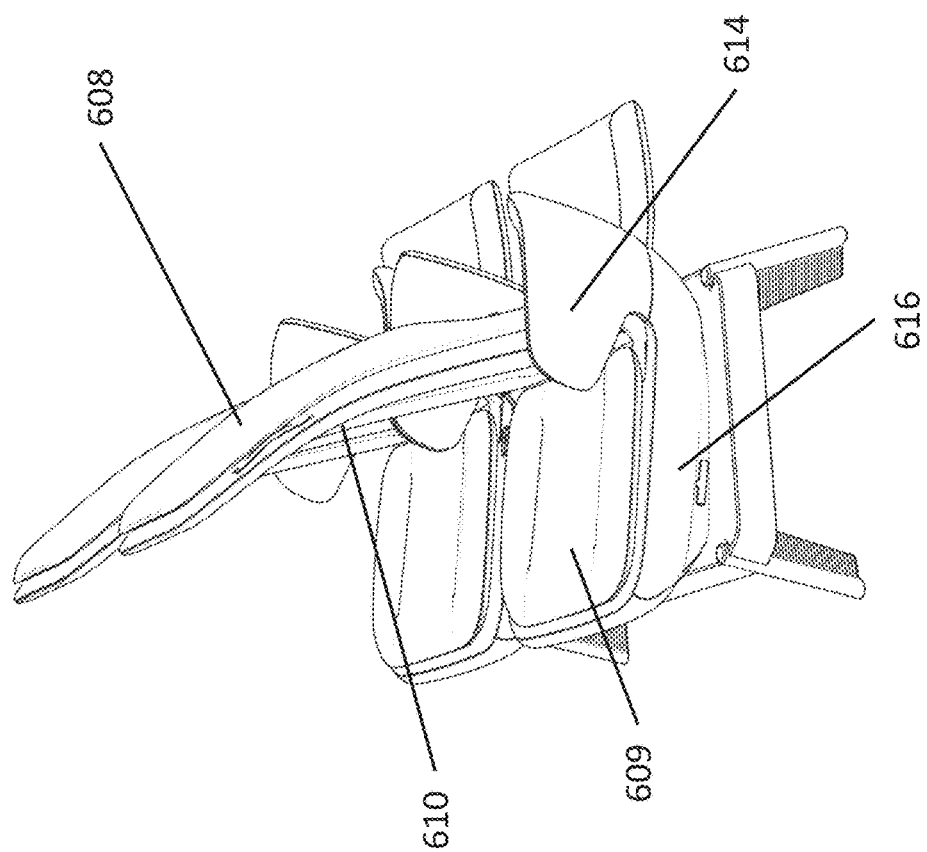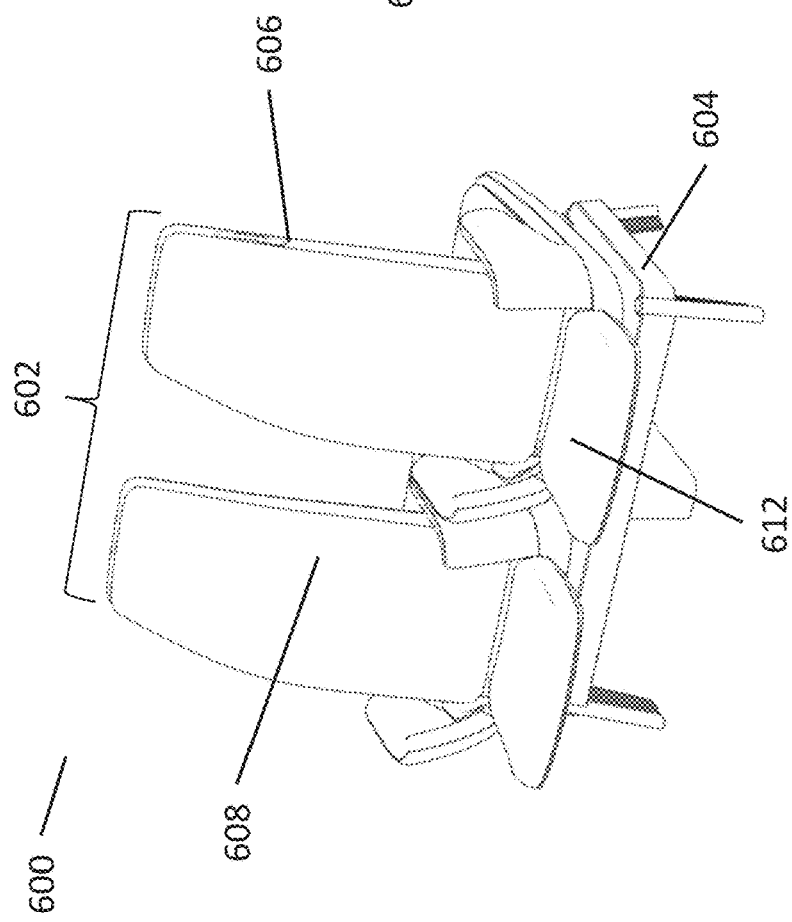

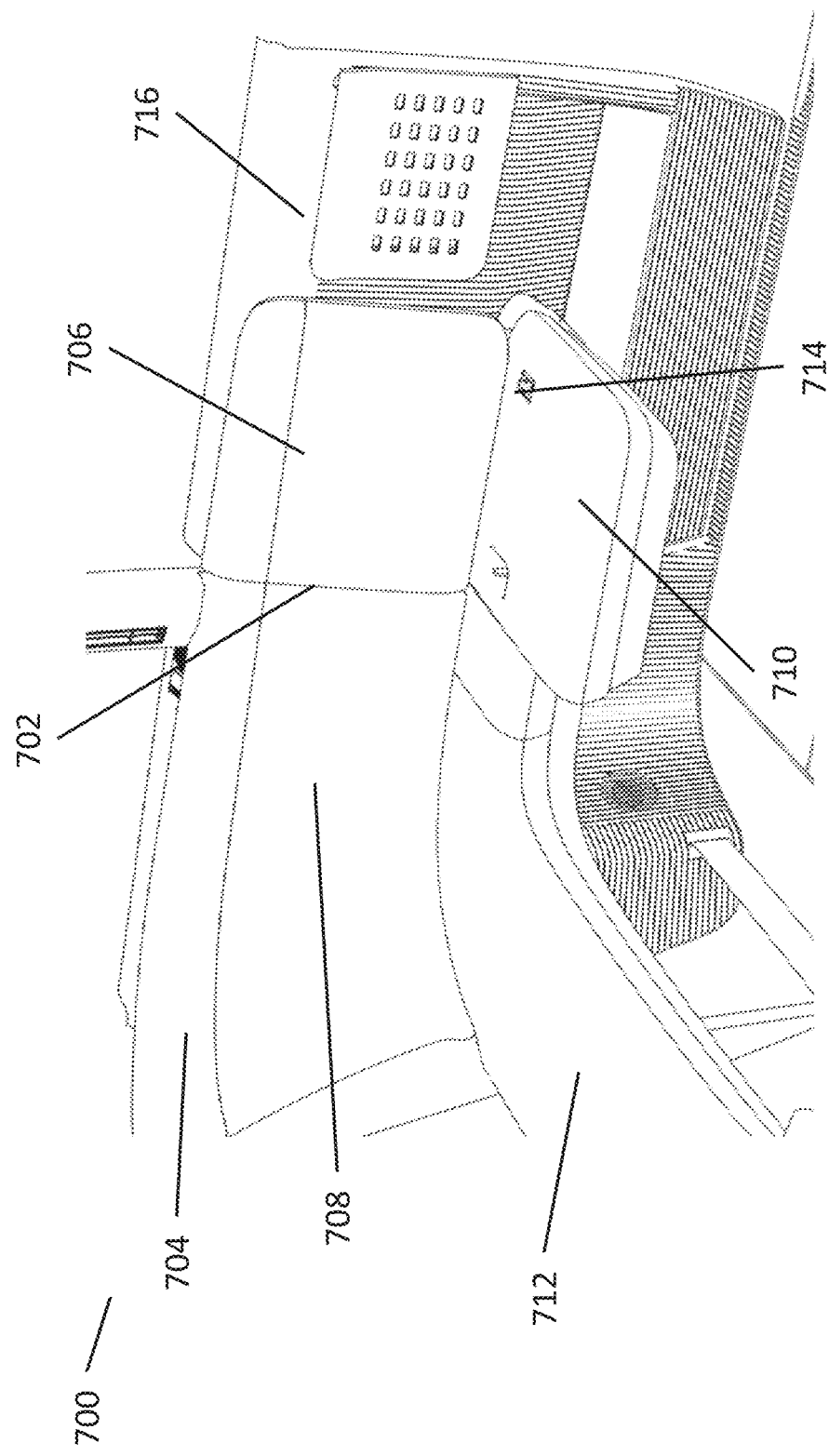

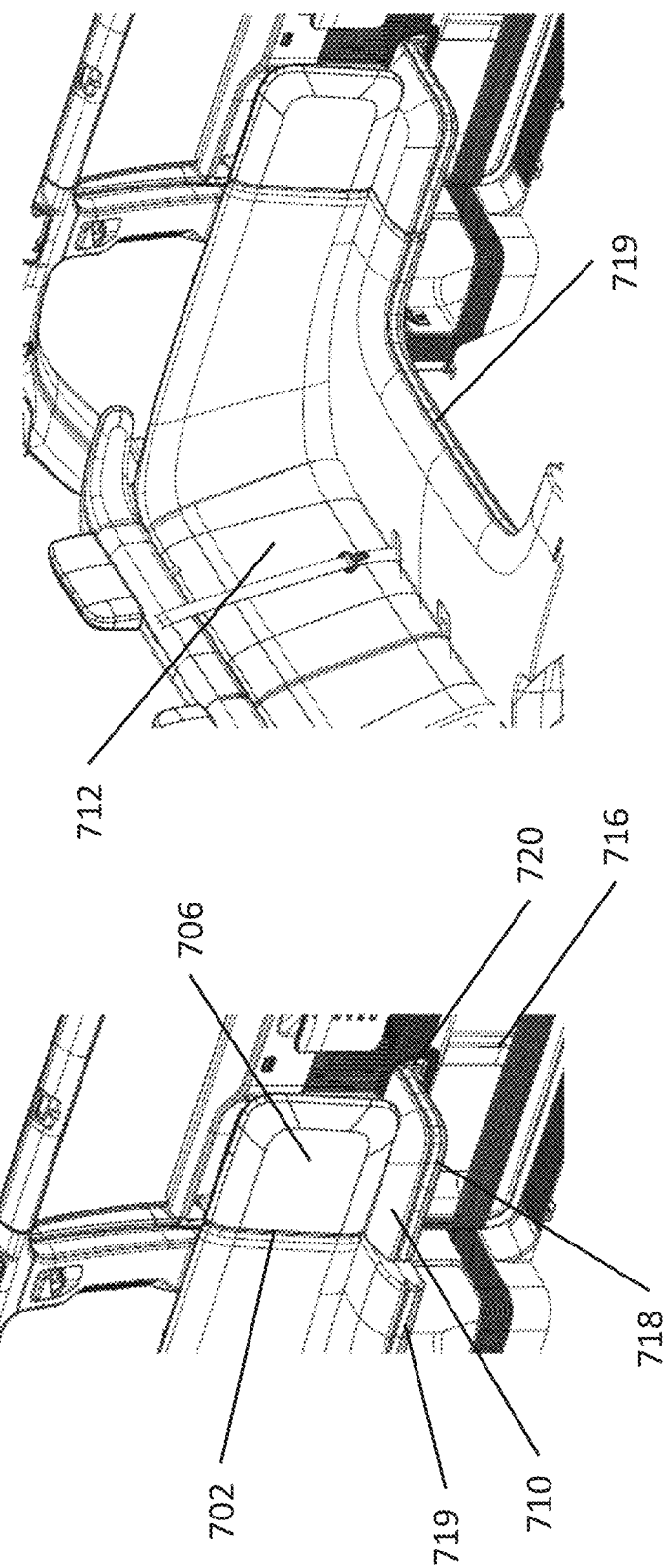

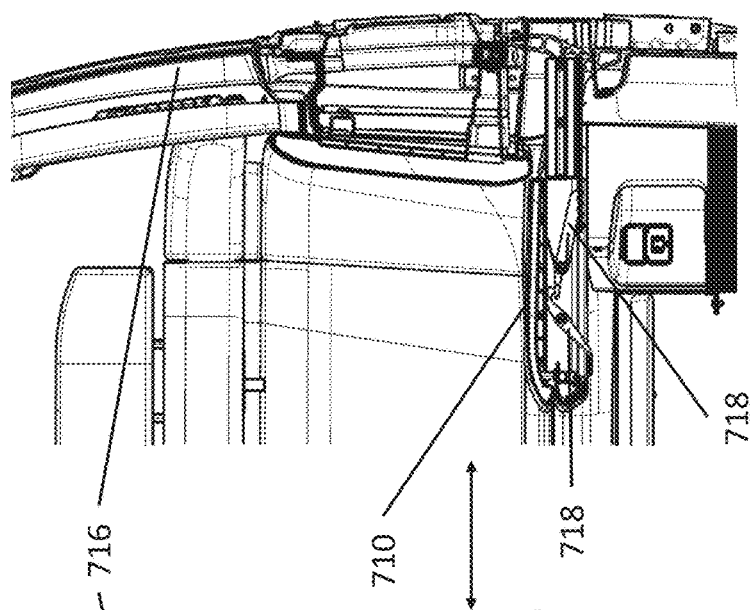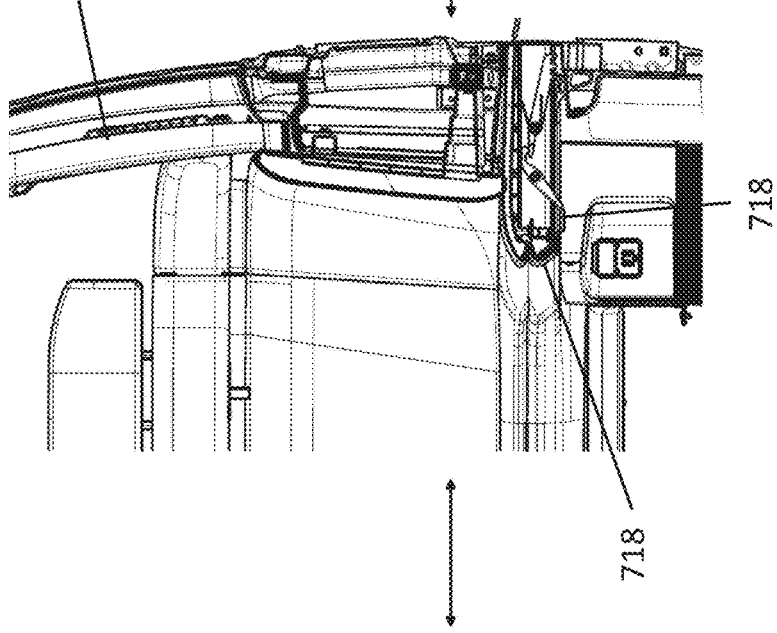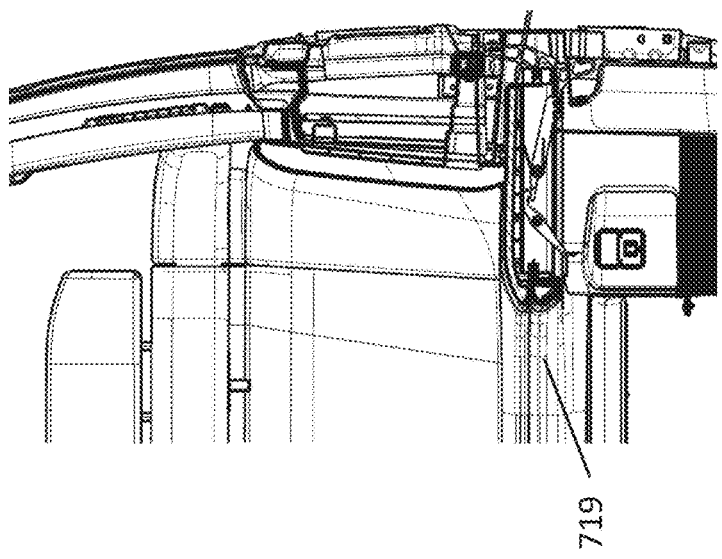

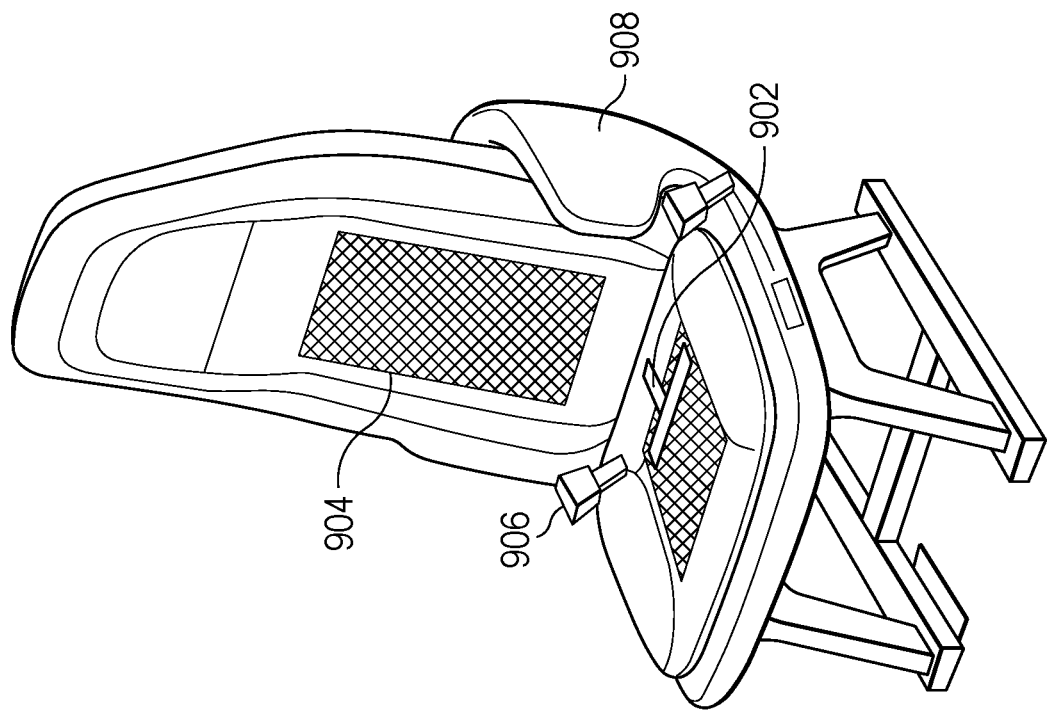
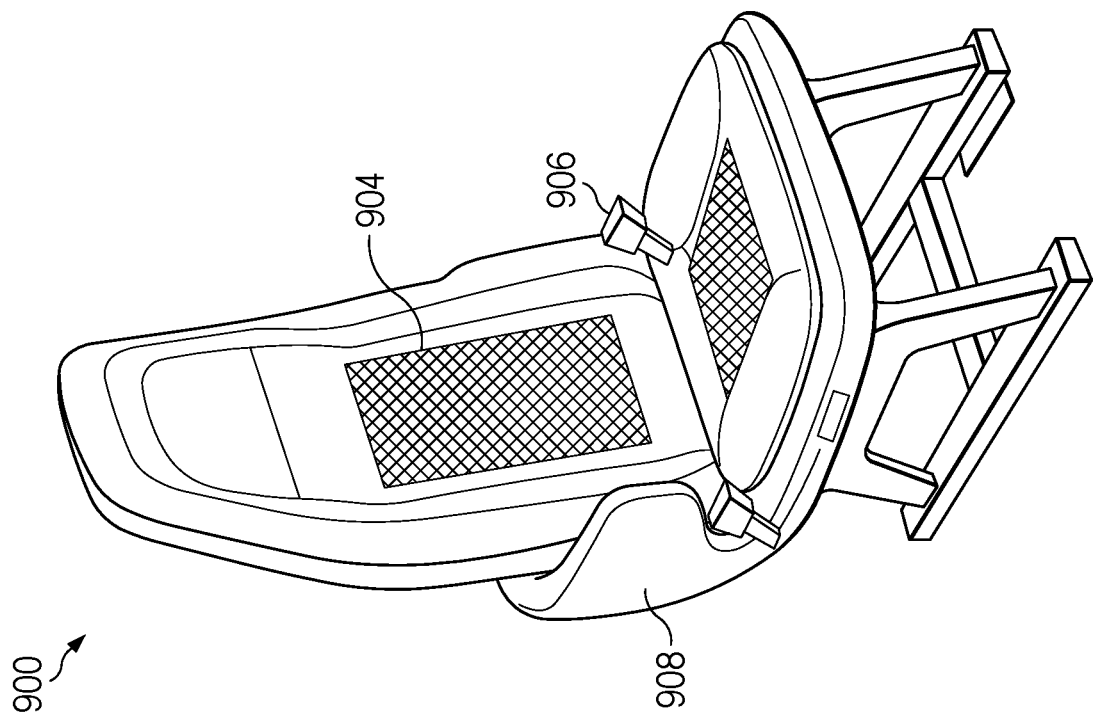
FIG. 9

VEHICLE SEATING SYSTEMS

CROSS-REFERENCED APPLICATIONS

This application claims priority under 35 U.S.C. § 120 as a divisional of U.S. patent application Ser. No. 17/027,600 filed on Sep. 21, 2020, which claims priority under 35 U.S.C. § 119(e) to U.S. Provisional Patent Application No. 62/903,715 filed on Sep. 20, 2019. Both of these applications are hereby incorporated by reference in their entirety.

FIELD OF THE INVENTION

The present invention relates generally to systems and methods for maintaining the safety of the passengers within the context of a vehicle.

BACKGROUND OF THE INVENTION

Automobile vehicles in general are comprised of many different structural and functional components. In some instances, they may generally be described in relation to a body or cabin, which are designed to enclose the passengers, and the various electrical, mechanical and structural systems, subsystems and components that allow the vehicle to operate. In traditional automobile design, the body and various functional systems and components are inextricably intertwined. For example, mechanical linkages directly interconnect the steering and brake systems between the wheels and the passenger, and elements such as the motor, transmission system, and cooling systems are disposed in a front enclosure that extends upward into the body of the vehicle. Additional structural components may serve to house certain functional elements essential for vehicle operation.

Recent advances in electric motor and battery technologies have made electric vehicles practical to manufacture. Electric vehicles have a number of advantages over conventional internal combustion vehicles, including the dramatically reduced footprint of the drive train components. Further advancements in signal processing and drive-by-wire technologies means that it is now possible to produce vehicle platforms containing all the necessary functional components of a vehicle. However, despite the potential these advancements represent most electric vehicles being produced today continue to incorporate designs that have been traditionally used in internal combustion engines. This can be particularly true for the framework and layout of many of the features including seating elements and the associated safety systems.

SUMMARY OF THE INVENTION

Many embodiments are directed to the seating and seating restraint and safety systems within the context of a vehicle platform in some embodiments, the seating arrangement and safety systems can be implemented in an electric vehicle platform. For example, many embodiments are directed to a vehicle seating system that has:
  at least a first seat having a primary seating element having a front portion and a rear portion wherein the primary seating element is connected to a base support structure wherein the base support structure is connected to a vehicle platform;
  a seat back element having an elongated body with front side and a rear side opposite the front side and a connected end and a disconnected end where the connected end is moveably connected to the primary seating element and wherein the seat back element is configurable to at least a first position and a second position; and
  a secondary seating element movably connected to at least a portion of the base support structure and configured to have a stored position and an open position wherein the stored position coincides with the first position of the seat back element and wherein the open position coincides with the second position of the seat back element, wherein the secondary seating element is disposed substantially parallel with the back side of seat back element while in the stored position, and wherein the secondary seating element is disposed substantially perpendicular to the connected end of the seatback element while in the open position.

In other embodiments, the secondary seating element is connected to the base support structure with at least one hinge element such that the secondary seating element can rotate between the stored position and the open position.

In still other embodiments, the secondary seating element is connected to the base structure with at least two hinge elements.

In yet other embodiments, the vehicle seating system has at least one arm rest movably connected to the vehicle seating system such that an occupant's arm may be positioned away from a door panel while located on the arm rest.

In still yet other embodiments, the arm rest has an elongated body extending away from the secondary seating element at a substantially perpendicular angle forming a flange like element such that when the secondary seating element is in the open position, a portion of the elongated body that is furthest away from the secondary seating element forms a first resting surface and when the secondary seating element is in the closed position the a side portion of the elongated body forms a second resting surface.

In other embodiments, the secondary seating element is removably connected to the base support structure.

In still other embodiments, the arm rest is rotatably connected to a side portion of the seat back element and wherein the arm rest has an elongated body with an attached end and a free end wherein the free end can rotate about an axis located at the attached end such that the arm rest can be rotated from the front to the back of the at least first seat such that it can serve as an arm rest for during the first or second position.

In yet other embodiments, the seat back element has an arched configuration such that the elongated body forms an arch between the connected end and the disconnected end.

In still yet other embodiments, the vehicle seating system has more than one arm rest.

In other embodiments, the vehicle seating system has an occupant position sensor disposed within the primary and the secondary seating elements and wherein the occupant position sensor is connected to a vehicle lock out system such that when the secondary seating element is in the open position and the respective occupant position sensor detects the presence of an occupant the vehicle lock out system will be engaged and prevent movement of a vehicle.

In still other embodiments, a side facing seat wherein the side facing seat has a back rest and a base seat that is movably connected to the back rest.

Other embodiments are directed to a side facing seat with a seat back element; and a moveable seat base element disposed below the seat back and wherein the moveable seat base element can be moved at least between a stored position and a seating position, and wherein the movement of the seat base element is controlled by an activation element that engages with a locking mechanism such that the locking mechanism can lock the seat base element in the stored position or the seating position.

In yet other embodiments, the moveable seat base element moves rotationally between the stored position and the seating position.

In still yet other embodiments, the side facing seat has at least one sliding rail connected to a bottom portion of the seat base element such that the movement of the seat base element is a sliding motion such that the seat base element slides between the at least stored position and the seating position.

In other embodiments, the side facing seat has a plurality of sliding rails.

In still other embodiments, the at least one sliding rail is manufactured of a material selected from a group consisting of aluminum, extruded aluminum, and steel.

In yet other embodiments, the seat back element is connected to an interior face of a door panel of a vehicle and wherein the door panel of the vehicle comprises an exterior face with an internal cavity disposed between the interior face and the exterior face with an open end on the interior face, and wherein the seat base element is configured to slide into and out of the internal cavity such that in the stored position a substantial portion of the seat base element is disposed within the internal cavity, and wherein in the seating portion all of the seat base element is disposed out of the internal cavity.

In still yet other embodiments, the side facing seat has a structural support element disposed beneath the seat base element and connected to the interior face of the door.

In other embodiments, the activation device is a level with an elongated body having a button end and an engagement end, wherein the engagement end engages with a portion of the locking mechanism such that the activation device can move the locking mechanism between a locked and unlocked position, button connected to a lever wherein the lever is configured to engage with the locking mechanism and move the locking mechanism between a locked and unlocked position.

In still other embodiments, the side facing seat has a first and second resilient member, wherein the first resilient member is connected to the engagement device and configured to allow the movement of the engagement device between an active and inactive position, and wherein second resilient member is connected to the locking mechanism and is configured to allow the movement of the locking mechanism between the locked and unlocked position.

In yet other embodiments, the activation device is an electronic activation device electronically connected to the locking mechanism.

In still yet other embodiments, the locking mechanism is a locking pin device.

In other embodiments, the side facing seat has a movement assist mechanism disposed beneath the seat base element and configured to assist the movement of the seat base element between the at least stored and seating position.

In still other embodiments, the movement assist mechanism is a hydraulic piston.

In yet other embodiments, the movement assist mechanism is a drive gear connected to a drive motor wherein the motor is configured to drive the gear between the at least stored position and the seating position.

In still yet other embodiments, the movable seat base element rotates between the stored position and the seating position.

Other embodiments are directed to an electric vehicle with a seating system in accordance with the numerous embodiments described herein.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

DESCRIPTION OF THE DRAWINGS

The description will be more fully understood with reference to the following figures, which are presented as exemplary embodiments of the invention and should not be construed as a complete recitation of the scope of the invention, wherein:

FIGS. 6A and 6B illustrate views of a modular seating element in accordance with embodiments of the invention.

FIG. 7A illustrates a side facing seating element in accordance with embodiments of the invention.

FIGS. 7B through 7D illustrate different positions of a side facing seat in accordance with embodiments of the invention.

FIGS. 7E through 7G illustrate a cross sectional view of a side seat in accordance with embodiments of the invention.

FIG. 9 illustrates a perspective view of front seating elements in accordance with embodiments of the invention.

DETAILED DESCRIPTION OF THE INVENTION

Turning now to the drawings, many embodiments a number of different seating systems that improve the overall function and design of the vehicle seating. For example, many embodiments include a passenger seat with a base seat or platform that has a back seating support that is connected to the base seat. The back support can have multiple positions and many embodiments may include a secondary seat base that is connected to the back support and can fold down to form the base of a rear facing seat. In conjunction with the base for the rear facing seat, the back rest can be rotated such that it serves as a back support for the rear facing seat. Thus, the passenger seat can have a front facing and a rear facing configuration without significant movement or adjustment to the support of the overall seat. In many embodiments, the passenger seats may include a number of different sensors and alternative systems that can detect the occupancy of a seat such a number of different safety and alert systems can be activated and/or engaged. In some embodiments, the seating configurations may include a side facing seat. The side facing seat, in accordance with numerous embodiments can be engaged or disengaged by folding and/or rotating into an open position for seating. Additionally, many embodiments include systems and methods designed to prevent the vehicle from moving when certain conditions are met.

Traditional vehicles, to include some electric vehicles tend to use a more traditional style seating arrangement and seating systems that are designed to provide comfort and safety to the vehicle occupants. For example, traditional vehicles tend to follow a front and rear vehicle layout with a front and rear passenger space that is often confined by the more traditional front engine compartment and a rear trunk space. Many modern vehicles also have a variety of safety features including passenger airbags and safety restraints. Additionally, some vehicles include a number of other safety mechanisms and methods that can control or prevent the movement of a vehicle in the event of an imminent collision.

Figure 1:
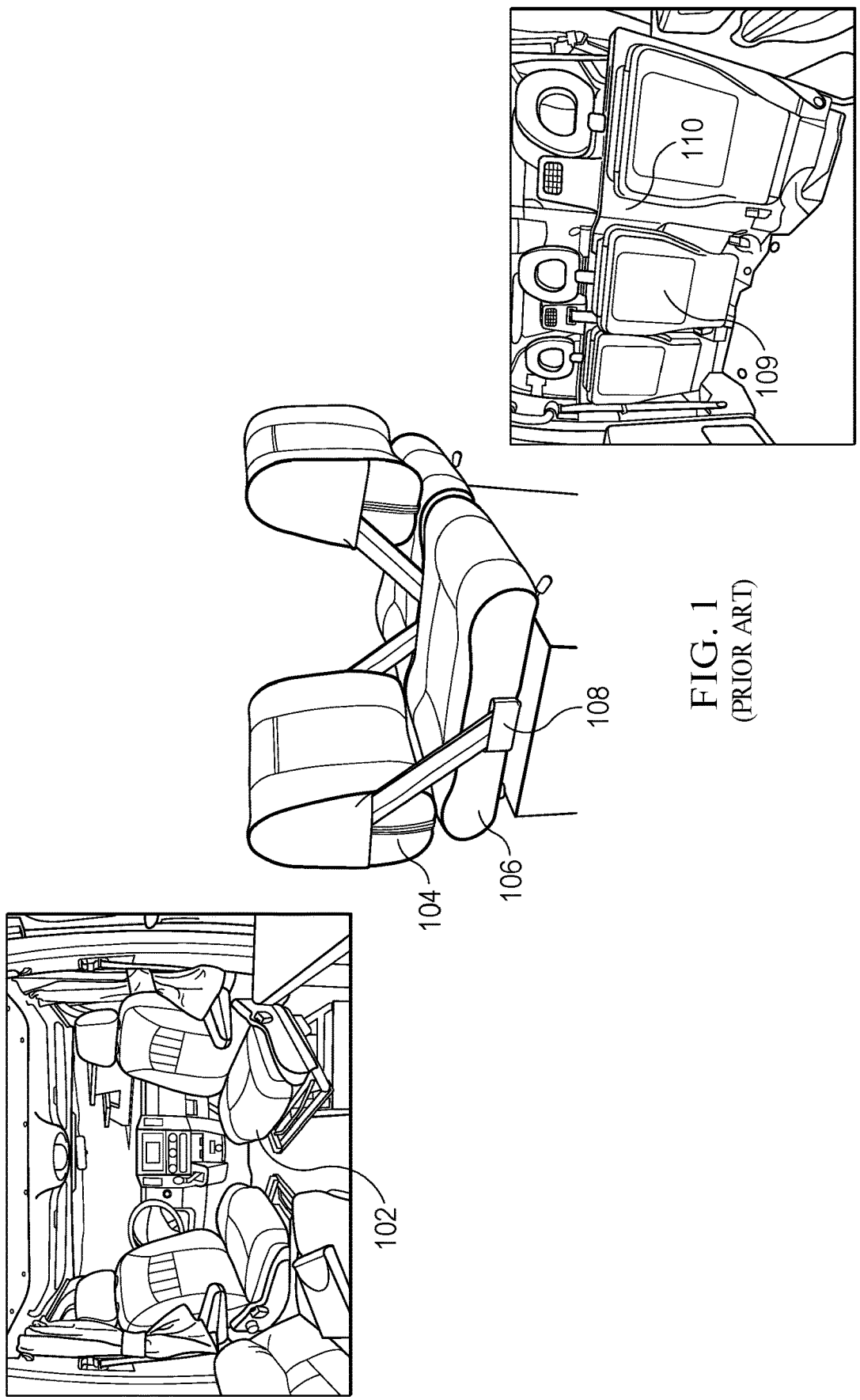
FIG. 1 illustrates various seating systems in accordance with known art.

As the development of vehicles have evolved, with the inclusion of electric vehicles, so have the various types of seats and seating arrangements within vehicles. For example, some seating designs that have allowed for adjustability have included electronic motors or actuators that can adjust a number of different positions of a seat such as the lumbar support, the position of the seat with respect to the steering wheel or steering mechanism as well as side to side and tilt adjustments. All of such adjustments can be used to improve the overall comfort of the passenger and/or driver of the vehicle. Additionally, with the evolution of vehicles have come different designs in how seats can be positioned within a vehicle. For example, FIG. 1 illustrates various designs of seats within a vehicle based on known art. Some seats may be configured to swivel 102 in their entirety where the whole portion of the chair or seat rotates around to be mostly rear facing. Other seat designs have shown to have a moveable back rest 104 that pivots from one side of the seat 106 to the next at a central pivot point 108, offering alternative seating positions. Some vehicle seating designs have offered fold down seating pieces 109 that are affixed to a rigid bulkhead element 110 where the bulk head element 110 can serve as a back rest as well as a support. Despite the different designs of various manufactures, many still fail to take advantage of the unique features that can be afforded through an electric vehicle platform. Furthermore, many such prior art seating configurations tend to be bulky and require a lot of room to adjust. Others, while simple, tend to be impractical for full scale implementation. Still some designs, such as the bulk head support can be uncomfortable and offer little to no adjustability to improve comfort. In contrast, many embodiments described herein offer a low mass, easily adjustable, space saving configuration that can improve the ability for occupants to occupy a rear facing position within a vehicle without compromising the spatial integrity of the vehicle. Moreover, many embodiments offer modularity such that the seating configuration within a vehicle can have a number of different layouts and still include all of the fundamental and necessary safety features of a modern vehicle.

Figure 2A:
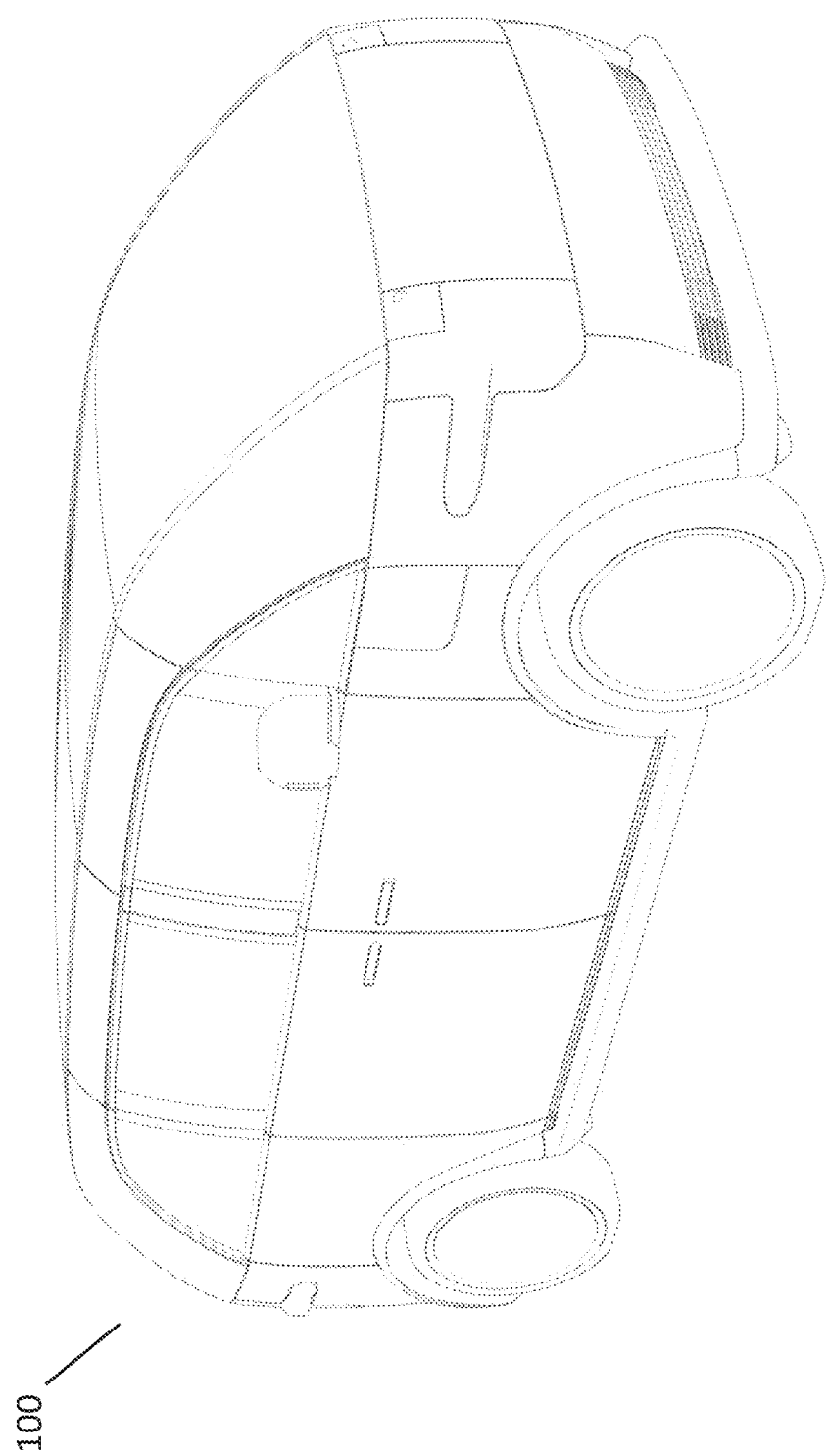
FIGS. 2A and 2B illustrate views of a vehicle in accordance with embodiments of the invention.
Figure 2B:
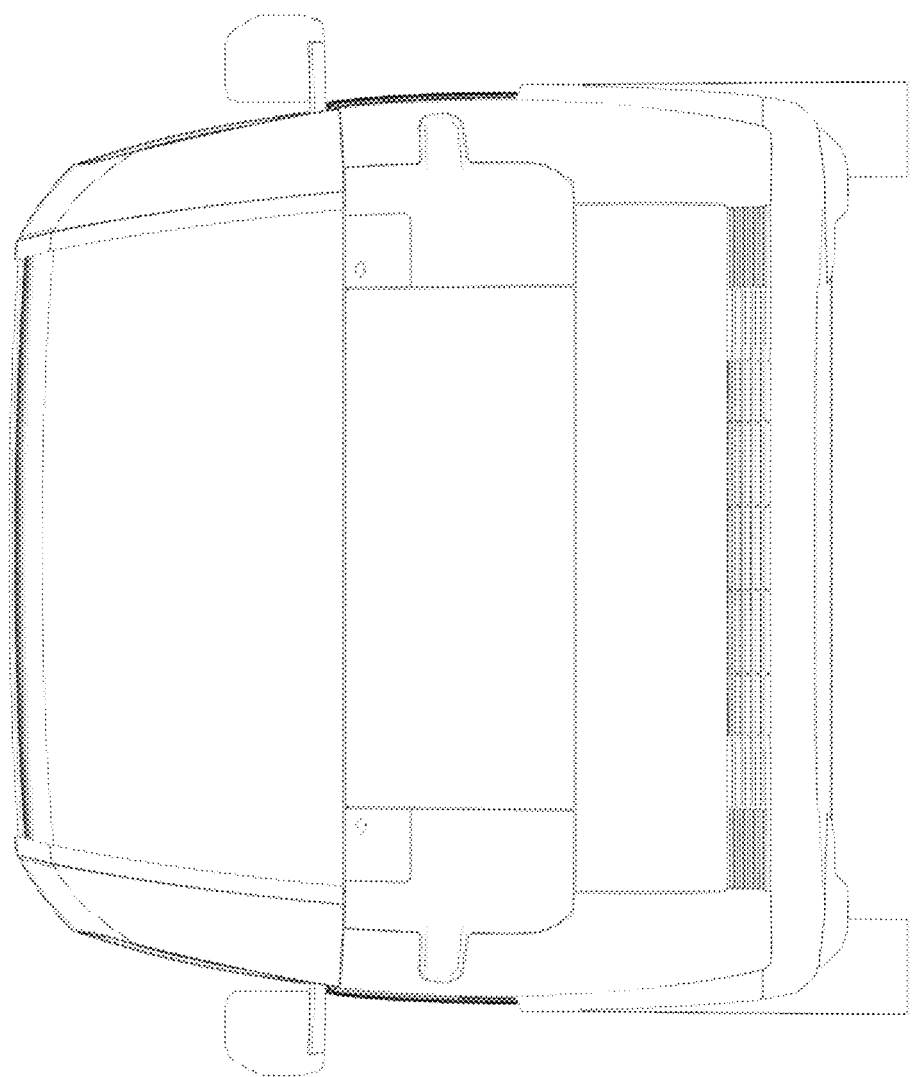
Figure 3:
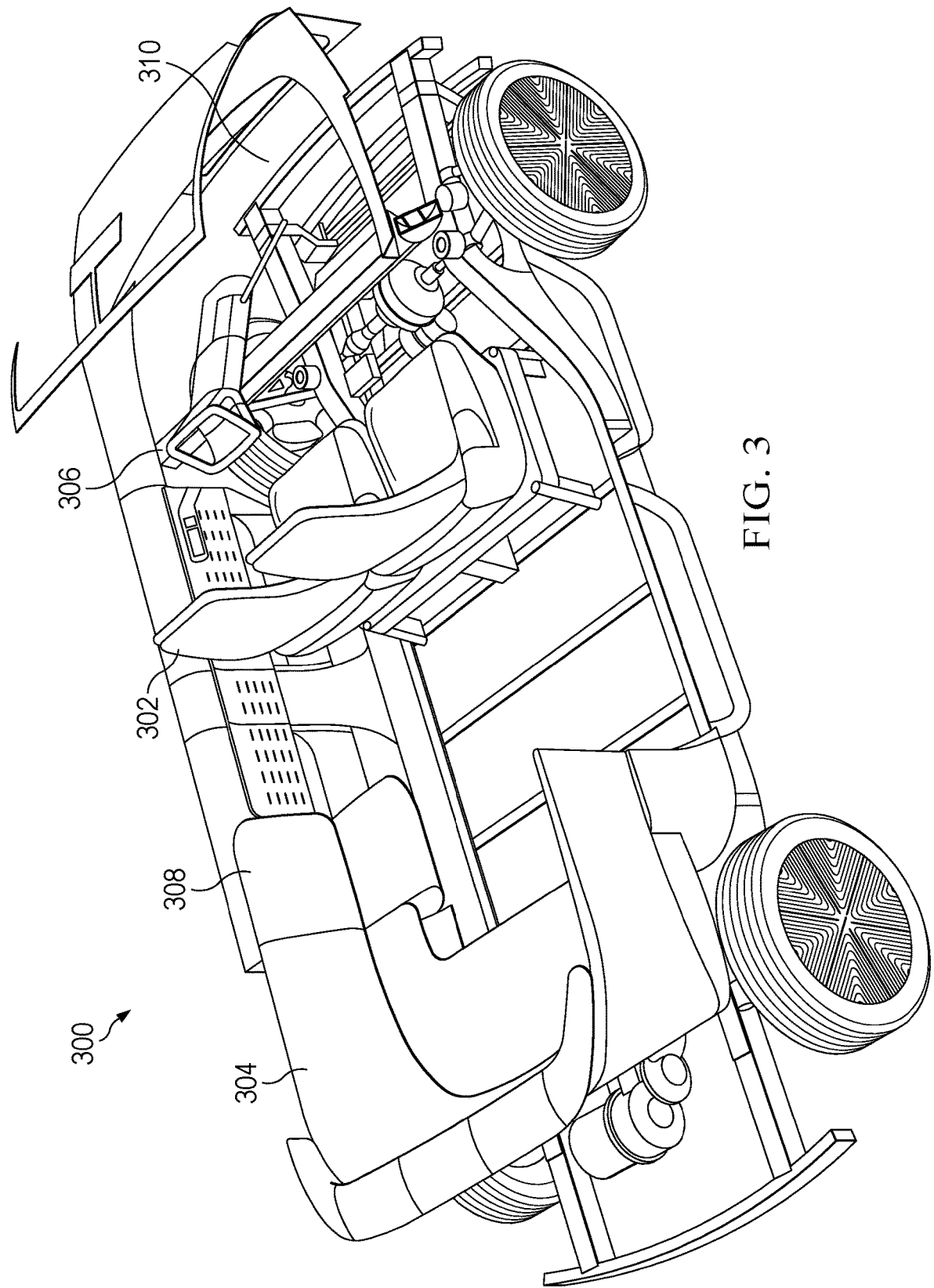
FIG. 3 illustrates a perspective view of a vehicle seating system in accordance with embodiments of the invention.

Turning now to the figures many vehicles 200 as illustrated in FIGS. 2A and 2B may be adaptable to a variety of different seating configurations such that the interior of the vehicle cabin can be open and spacious. For example, FIG. 3 illustrates an interior view of a vehicle 300 with what may appear to be a traditional front 302 and rear 304 seating arrangement that is positioned behind a steering mechanism 306. However, some embodiments may incorporate a non-traditional side facing seat 308. Although a more traditional seating configuration may be illustrated, many embodiments can take advantage of an electric vehicle platform 310 that does not have a traditional front engine compartment or the traditional trunk space in the rear. Accordingly, many embodiments can position the front seats 302 more forward in the vehicle and thus provide a more open rear portion for the rear seats 304 and the side facing seat 308. Additionally, many embodiments can have front seats 302 with alternative configurations that can further open the cabin and seating configuration.

The various embodiments described herein illustrate a vehicle seating arrangement that improve the overall comfort and modularity of vehicle seating layouts. While the current disclosure may divide many of the functional and structural elements of seating systems into individual sections for clarity, it will be understood that vehicle seating arrangement and individual seating systems, according to embodiments may combine, include or omit any of the described elements as desired by a specific vehicle design.

Embodiments of Seats

Figure 4A:
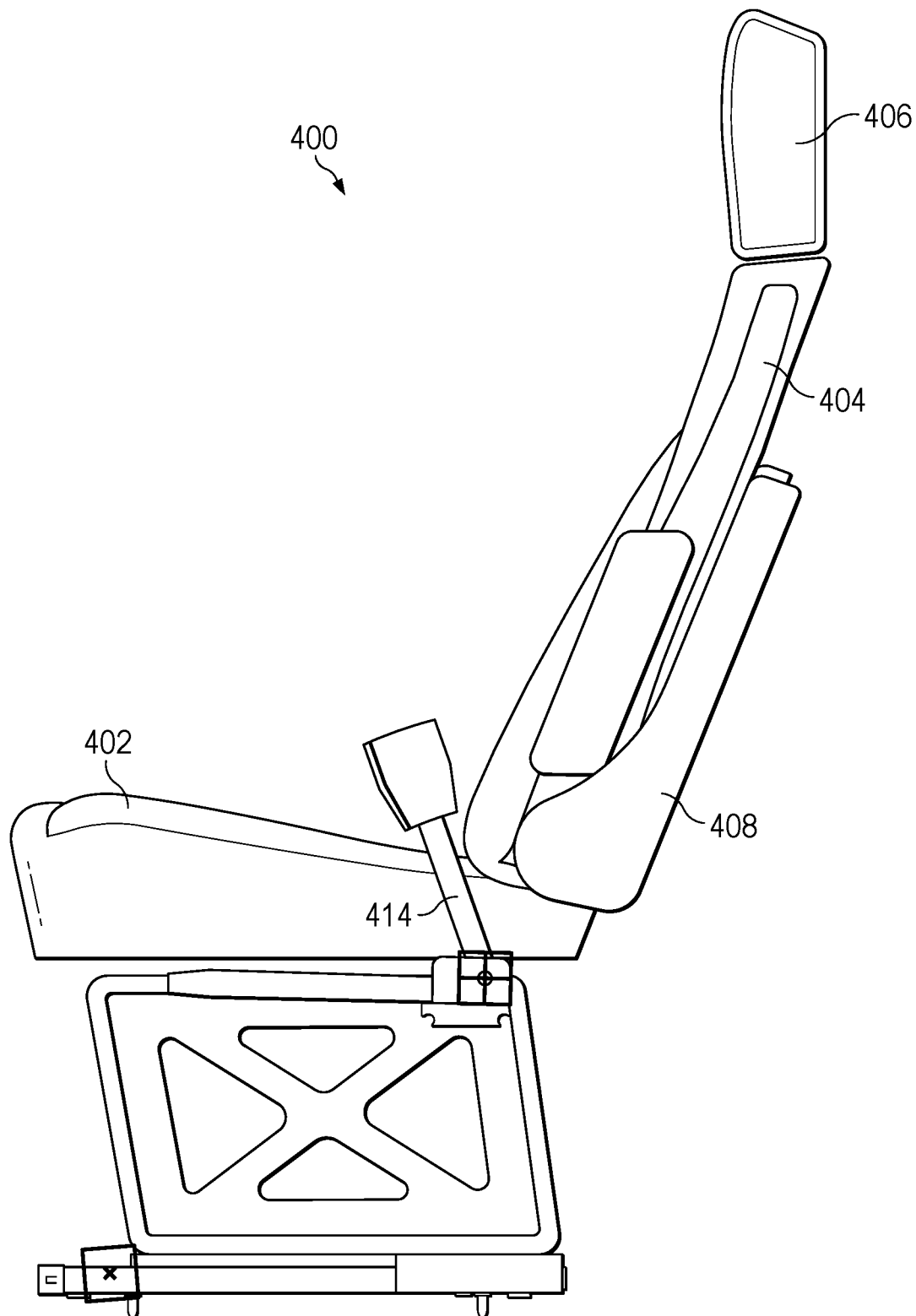
FIGS. 4A through 4G illustrate a seating element in accordance with embodiments of the invention.
Figure 4B:
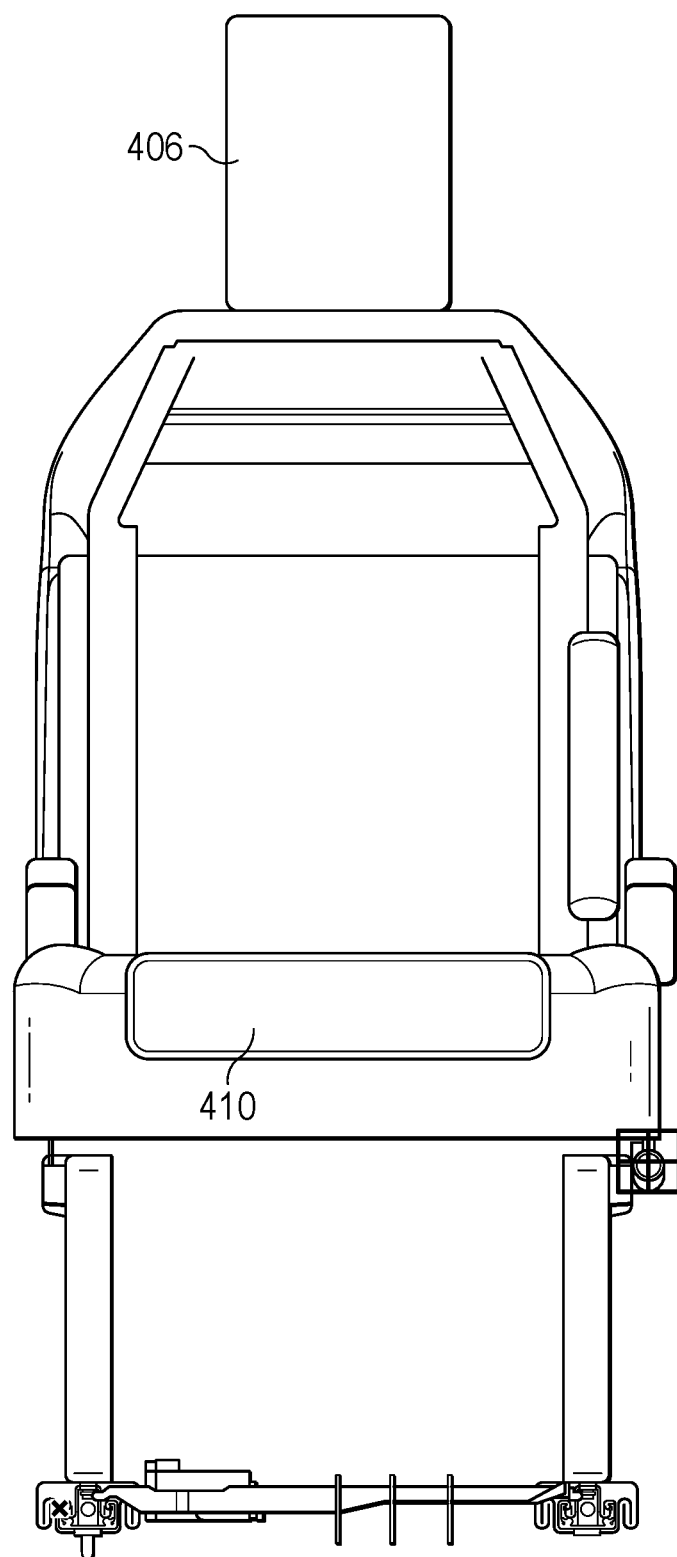
Figure 4C:
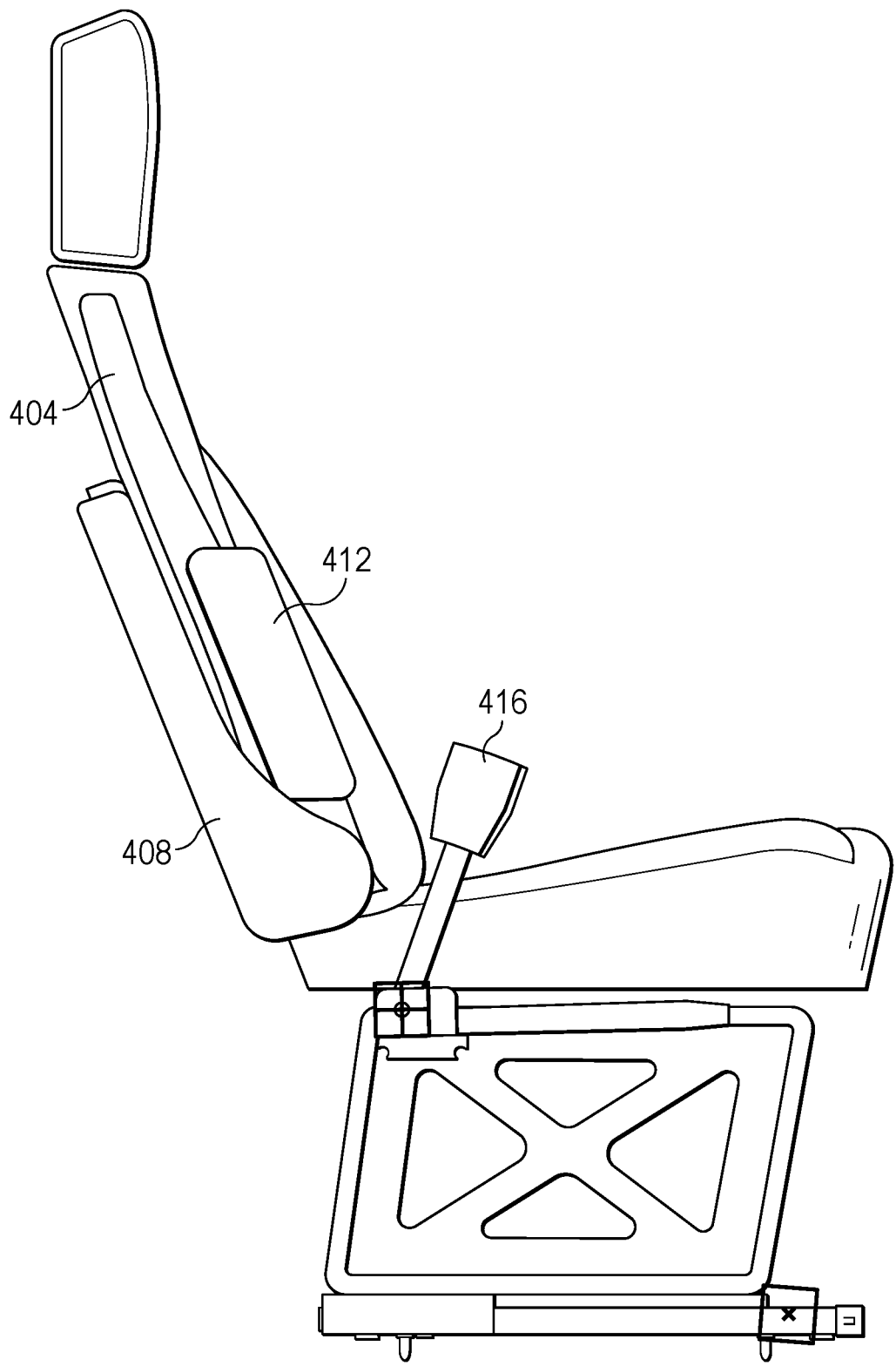

FIGS. 4A through 4H, for example, illustrates passenger seats 402 for a vehicle that can be configured with multiple seating positions as well as contain multiple integrated safety system sensors and/or switches that can be activated in response to the various seating positions. FIGS. 4A through 4C illustrate side and front views of a passenger seat 400 with a base seating element 402 and a back rest 404 in accordance with many embodiments. Some embodiments of a vehicle seat may also contain an upright head rest 406. Although such basic seating components are relatively known in the art, many embodiments of a vehicle seat may also contain a connected secondary seating base 408 that is connected to the overall seat 400. In accordance with some embodiments, the vehicle seat may also contain one or more occupant position sensors 410 that can be located within the primary or secondary or both seat bases of the overall seat 400. An occupant sensor can be used in a number of different ways to help ensure the ultimate safety of the vehicle and occupants is maintained. This can be done by preventing use of the secondary seat base 408 when an occupant positioned in or using the primary seat base 402. Additionally, the occupant sensor in the secondary seat base 408 can be used to prevent movement of the vehicle when the secondary seat base 408 is in use. Many embodiments of a seat 400 may also include more traditional seating elements such as lumbar support systems 412, safety restraint latches 414 as wells as seat adjustment mechanism 416. The seat adjustment mechanisms can be used to adjust the seat in the traditional sense of up, down, forward, and backward as well as tilt. In many embodiments seat adjustment mechanisms can also be adapted to control the movement of the seat back 404 between the front and rear facing configurations.

Figure 4E:
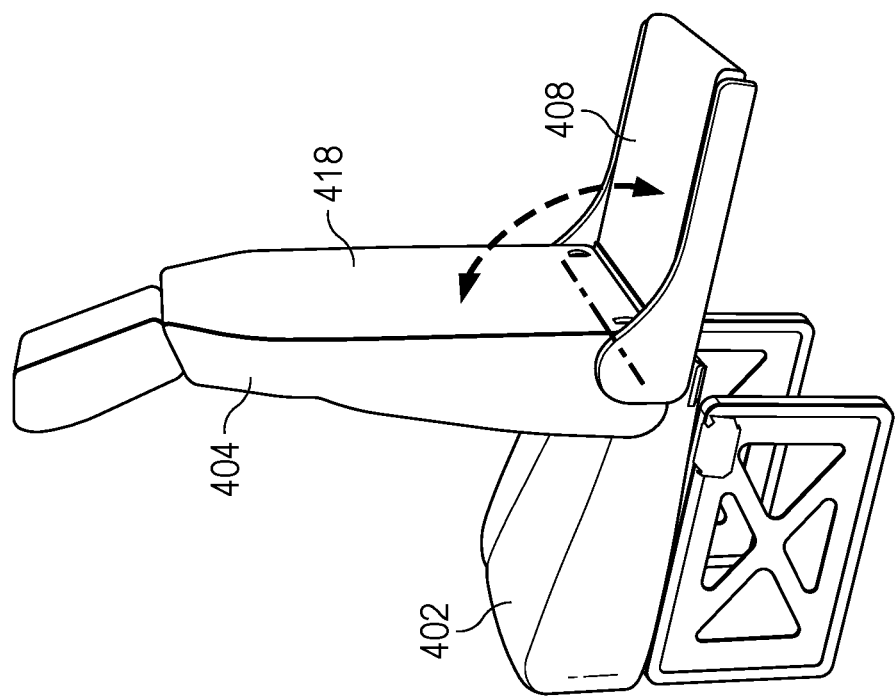
Figure 4D:
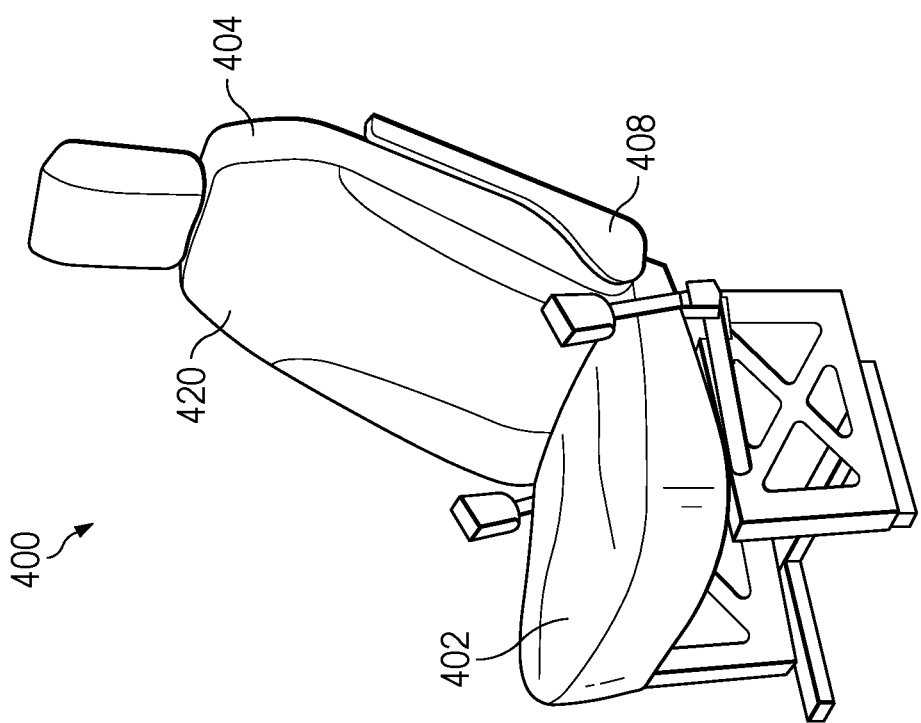
Figure 4G:
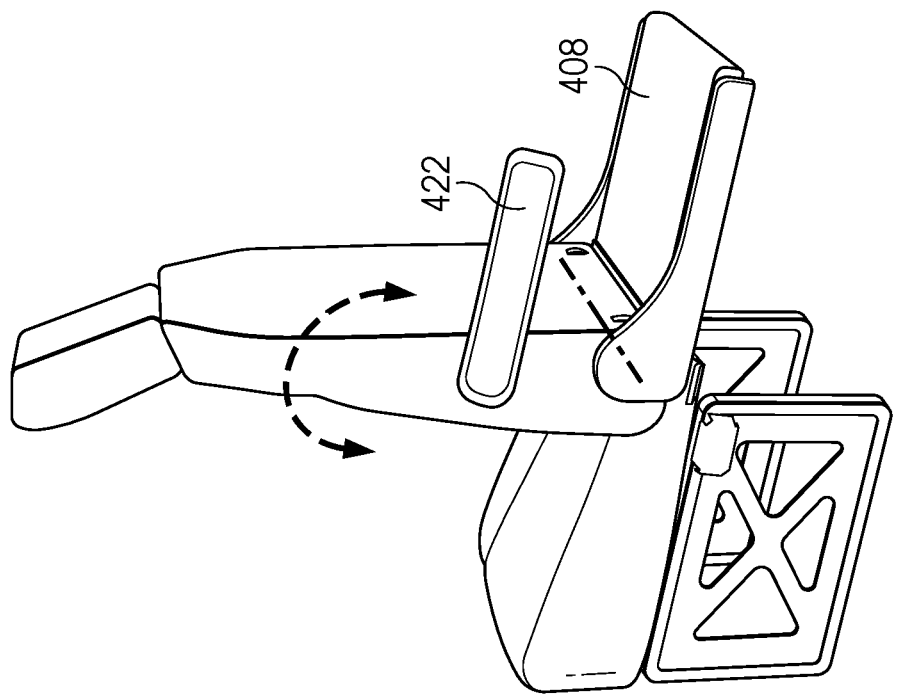
Figure 4F:
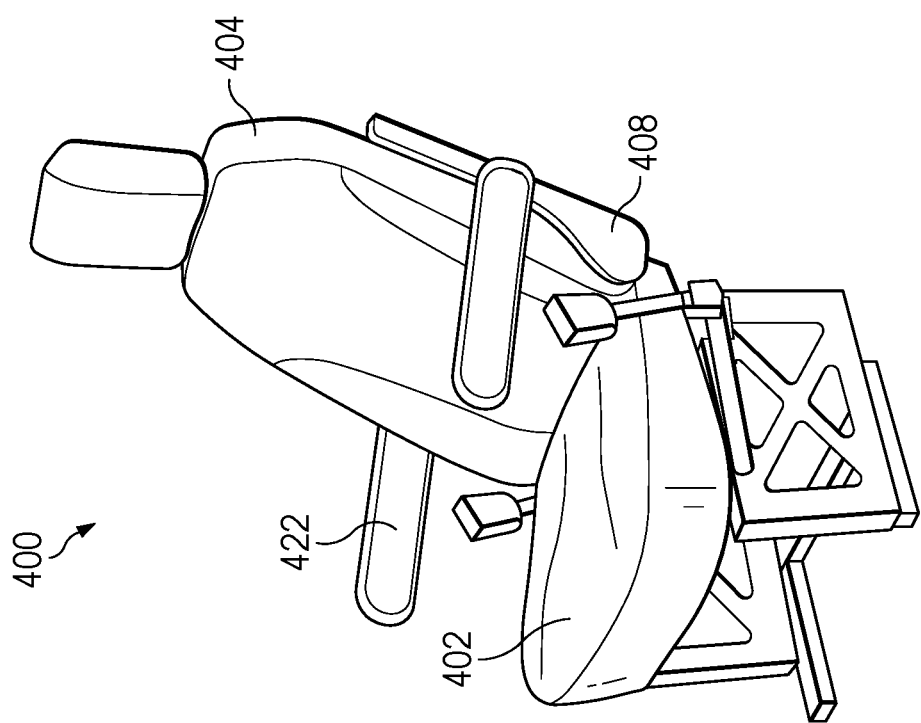

Turning now to FIGS. 4D through 4G various seating configurations of a seat 400 can be illustrated. For example, FIG. 4D illustrates a seat 400 in a front facing configuration (FIG. 4D), where the back support 404 is positioned in a more upright position such that an occupant may sit on the primary seating element 402 while the secondary seating element 408 is in an upright position and is configured substantially parallel with the back rest 404. In numerous embodiments, the secondary seat element 408 can be moved into an engaged position, as illustrated in FIG. 4E. The secondary seat element 408 can be moved into position by a rotational movement in some embodiments, while other embodiments may use a sliding mechanism to move the secondary seat element into a seating position. In addition to the movement of the secondary seating element 408, many embodiments may incorporate the movement of the back rest 404. The back rest 404 can be moved or rotated towards the front of the seat 400 such that it can also serve as a back rest for an occupant seated in the secondary seating element. Thus, the seat can have two different configurations in which the back rest serves both front and rear facing positions. In accordance with many embodiments, the back rest may be configured with cushion elements on both the front 418 and the rear 420 portions of the back rest 404. In accordance with some embodiments, the seat 400 may be configured with one or more arm rests 422 that can be positioned for the front facing position (FIG. 4F) or the rear facing (FIG. 4G). As can be appreciated the arm rest 422 can rotate and be secured in a number of different positions such that it can serve as an arm rest for a forward and a rearward facing configuration of the seat 400. It can also be appreciated that the seat 400 may be configured with more than one arm rest and that the arm rest 422 can be removed as needed or desired. Traditional vehicles place the more external driver and passenger arm rests within the door panel. This tends to place the occupant in close contact with the actual door panel which could pose potential risk to the occupant in the event of a side impact. Accordingly, many embodiments that may incorporate an arm rest configure the arm rest to be connected to the seating element in some fashion. This can improve the overall safety of the occupant by positioning them further from the door in the event of a side impact.

Figure 5A:
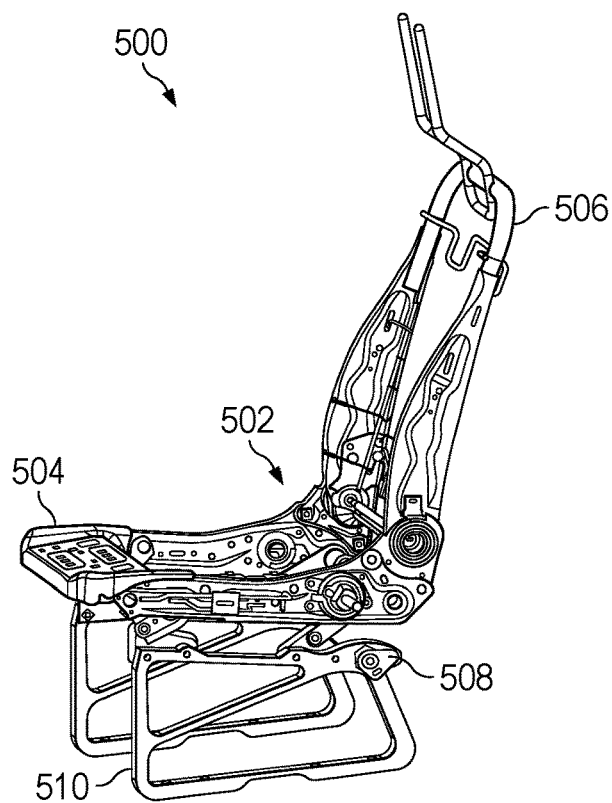
FIGS. 5A through 5C illustrate a seating element with a modular rear seat in accordance with embodiments of the invention.
Figure 5B:
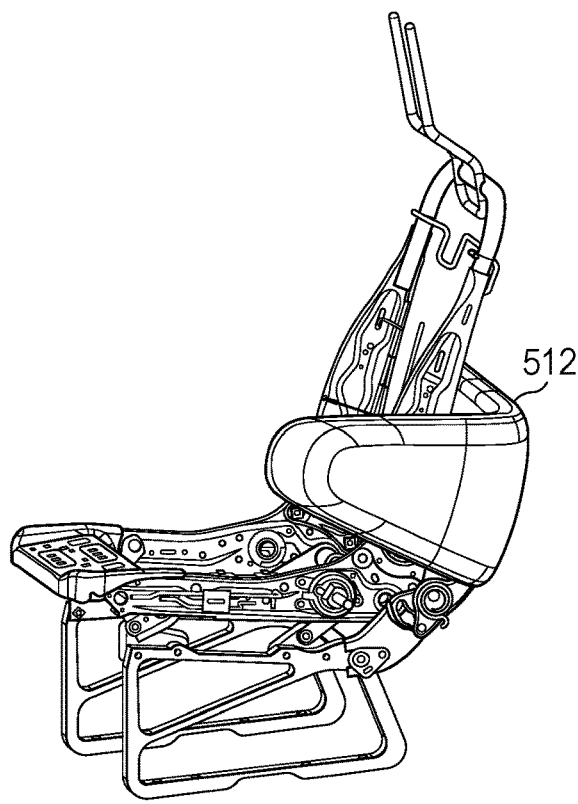
Figure 5C:
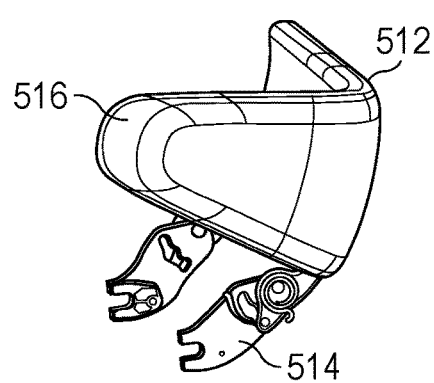

Seats, as described above can take on any number of configurations and may be adapted for a driver or passenger position within a vehicle. Additionally, in some embodiments the secondary seat element as described above can take on any number of configurations. For example, FIGS. 5A through 5C illustrate a vehicle seat 500 with a base frame unit 502 that has a seat portion 504 and a back rest portion 506. The base frame 502 can have a number of different attachment points 508 that can be used to connect the base frame 502 to a support structure 510 or to the rear seating element 512.

The rear seating element 512, in accordance with various embodiments, can be connected to the base frame 502 with a hinge element 514. The hinge element 514 can allow the rear seating element 512 move from an upright position (FIG. 5B) to a seating position. Moreover, the hinge element can take on any number of forms. For example, as illustrated in FIGS. 5B and 5C, the hinge element 514 can be laterally attached to the base frame 502. In numerous embodiments, the hinge element 514 may be a horizontal based hinge that is attached laterally across the width of the base frame 502. Although a specific hinge element is illustrated, it can be appreciated that any number of hinges can be used such that the rear seating element 512 can be moved from one position to another.

In addition to the various configurations of hinged elements or moveable connections between the base frame 502 and the rear seating element 512, some embodiments of a vehicle seat may incorporate a rear seating element 512 with an integrated arm rest 516. The integrated arm rest 516 can be advantageous in that only a single element is needed for the seat 500 when it is in either the front or rear facing positions. It can be appreciated that the rear seating element 512 and integrated seating element 516 can take on any number of different configurations and or designs that may be suitable for the various vehicle configurations. Furthermore, it can be appreciated that the hinged element 514 can allow for the easy removal of the rear seating element 512 such that it can be repaired and/or replaced with a new or updated design or a repaired element. Such modularity can be advantageous form a maintenance standpoint as well as a cost savings for potential users. Rather than have to repair or replace the entire seat 500 individual elements such as the rear seating element 412 and the back rest 506 can be removed and replaced as needed, thus minimizing the overall cost of repairs.

As previously discussed, vehicle seating and seating elements can take on a number of different configurations. For example, FIGS. 6A and 6B illustrate alternative seating configurations for a front eat with rear facing seat from those previously illustrated. FIGS. 6A and 68 illustrate a vehicle seat 600 where two seat elements 602 that are interconnected on a single support structure 604. Similar to various single seat embodiments, dual seat embodiments as illustrated in FIGS. 6A and 6B may be configured with seat back elements 606 that can rotate between a front and a rear facing position. It can be appreciated that the seat back 606 can take on any number of designs such as an arched type design as illustrated in FIGS. 6A and 6B. The arched shape of a seat back 606 can be advantageous for many embodiments because a convex side 608 can serve as the back support for the rear facing position. As can be illustrated the seat back 606 can be rotated such that it leans over a primary seating element 609 when in a rear facing position. Alternatively, the concave side 610 can serve as an appropriate back support for a front facing position. Although not illustrated in FIGS. 6A and 6B it can be appreciated that the seat back element 606 can be rotated such that the convex side is leaning towards the rear of the seat 600 such that it might provide an adequate back support for an occupant in the primary seating element.

Additionally, as with many embodiments described herein, the rear seating element 612 can be positioned in a seating position and/or a storage position. Illustrated in FIGS. 6A and 6B the rear seating element 612 is positioned in an open configuration that would be suitable to use the seat as a rear facing seat. As illustrated in previous figures, the rear seating element can be rotated or moved into a stored position such that it can prevent intrusion into the rear occupant space of a vehicle. In numerous embodiments, the rear seating element 612 of one seat can be stored while the other is in a seating position. Moreover, since many embodiments may be configured with arm rests 614 that may be moveable connected or may be stationary, it can be appreciated that the arm rests may take on any number of different forms. For example, FIGS. 6A and 6B illustrate an embodiment of a seat 600 with armrests 614 that are integrated with or continuous with a seat frame element 616. In some embodiments the integrated arm rests 614 may be movable or rotatable similar to those illustrated previously. Additionally, it can be appreciated that the position of and movability of the arm resets, in accordance with some embodiments, can allow for improved ingress and egress from the vehicle. In numerous embodiments the seat frame element may also have integrated controls and safety elements such as seatbelt attachment points and/or other safety sensors and switches. Furthermore, as can be appreciated many embodiments of the rear seating element may incorporate a release mechanism that can allow for the complete removal of the rear seating element from the overall seat 600. This can allow for increased modularity of the seat design as well as provide for greater adaptability. For example, as can be readily appreciated, seating elements and various seating components can be manufactured with any number of materials including, but not limited to, metal, plastic, foam, cloth, leather, etc. Additionally, many components can be made of any desirable color or configuration. Accordingly, it can be advantageous to have a modular seat design such that individual elements such as the rear seating element 612, the seat back 606, and or the arm rests 614 can be removed or exchanged for different components of different colors or designs for a more customized appearance and feel.

The various embodiments described herein illustrate vehicle seating systems and elements that improve the overall comfort and modularity of vehicle seating. While the current disclosure may divide many of the functional and structural elements of seating systems, it will be understood that any seating element described, according to embodiments may combine, include or omit any of the described elements as desired by a specific vehicle design.

Embodiments of a Side-Facing Seat

Modularity and adaptability of the various components of a vehicle seating design can be advantageous from a variety of standpoints. Numerous embodiments of a vehicle seating design offer improved adaptability to be able to accommodate additional passengers when needed. For example. FIG. 7 illustrates an embodiment of a rear seating design 700 that incorporates a side facing seat 702. The side facing seat 702 can be an extension of the existing rear seat 704 such that a back support 706 is substantially continuous with the rear back support 708. Additionally, the side facing seat 702 can have a movable seat base 710 that can be configured in a number of different positions such that the top portion is substantially level with the rear seat base 712. It can be appreciated that the movement of the seat base 710 can be done in a number of different ways such as folding, rotating, sliding etc. to locate the seat base 710 into position. In numerous embodiments the side facing seat 702 can also be equipped with various safety devices such as a seat belt restraint latch 714 as well as any number of sensors. In some embodiments, the side facing seat may be an integral part of a vehicle door panel 716. In many embodiments, the side facing seat 702 can be folded into a stored position when not in use. Other embodiments can allow for the side facing seat 702 to be removed completely rather than stored an easily reattached when additional occupant space is required.

As was previously discussed the movement of the seat base can be done in a number of different methods such as folding, rotating, sliding, etc. such that the seat base 710 can be moved into the desired position. For example, FIGS. 7B through 7G illustrate a side seat 702 with different configurations such as a stored position (7B and 7E) to a fully extended position (7D and 7G) as well as a design position (7C and 7F). Although certain positions are illustrated, it should be understood that the seat base 710 can be placed in a number of different positions in a number of embodiments. In accordance with numerous embodiments, the side seat 702 can be connected to a door panel 716 of a vehicle. Accordingly, the seat base 710 of the side facing seat 702 can be moved into a stored position such that the front face of the seat base 718 is offset from the front face of the rear seat 719. Additionally, such configuration can provide for a portion of the seat base 710 to be stored or located within a cavity 720 of the door panel 716. When the seat base 710 is in a stored position, it can be appreciated that egress and ingress of the vehicle can be made easier since the seat base 710 is not extended and in the way of an occupant that is entering the vehicle.

In many embodiments, the seat base 710 of the side seat 702 can have what can be considered a design position as illustrated in FIGS. 7C and 7F. In the design configuration the seat base 710 can be moved into a position such that the front face 718 is continuous with the front face 719 of the main rear seat 712. Accordingly, such embodiments or positions can provide for a more aesthetic appearance in the rear seat configuration. Although the design configuration may appear to be aesthetic, it could be appreciated that an occupant could use such configuration to sit if needed.

Figure 7D:
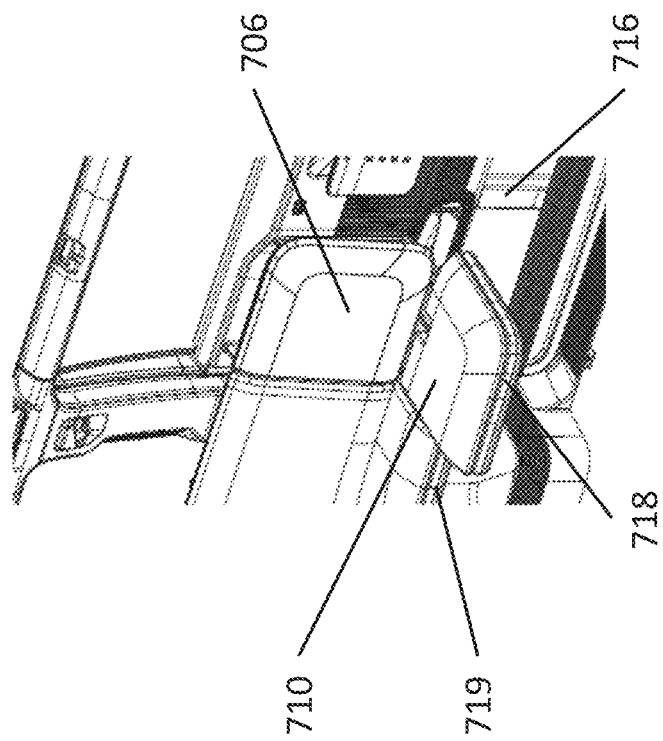

As can be appreciated, the rear seat 702 can be configured to allow an occupant to fully occupy the seat 702 during a stationary position as well as while moving. As such, many embodiments may allow for the seat base 710 to be moved into a deployed position as illustrated in FIGS. 7D and 7G. In a deployed position, the seat base is extended such that the full seat base 710 is exposed and the front face 718 is offset from the front face of the rear seat 719. As such, an occupant can safely utilize the seat and access the various safety devices while using the seat. As can be further appreciated the side seat 702 can be moved from one position to the other based on the desired position. This can be further illustrated by the bi-directional arrows in FIGS. 7E to 7G.

Figure 7H:
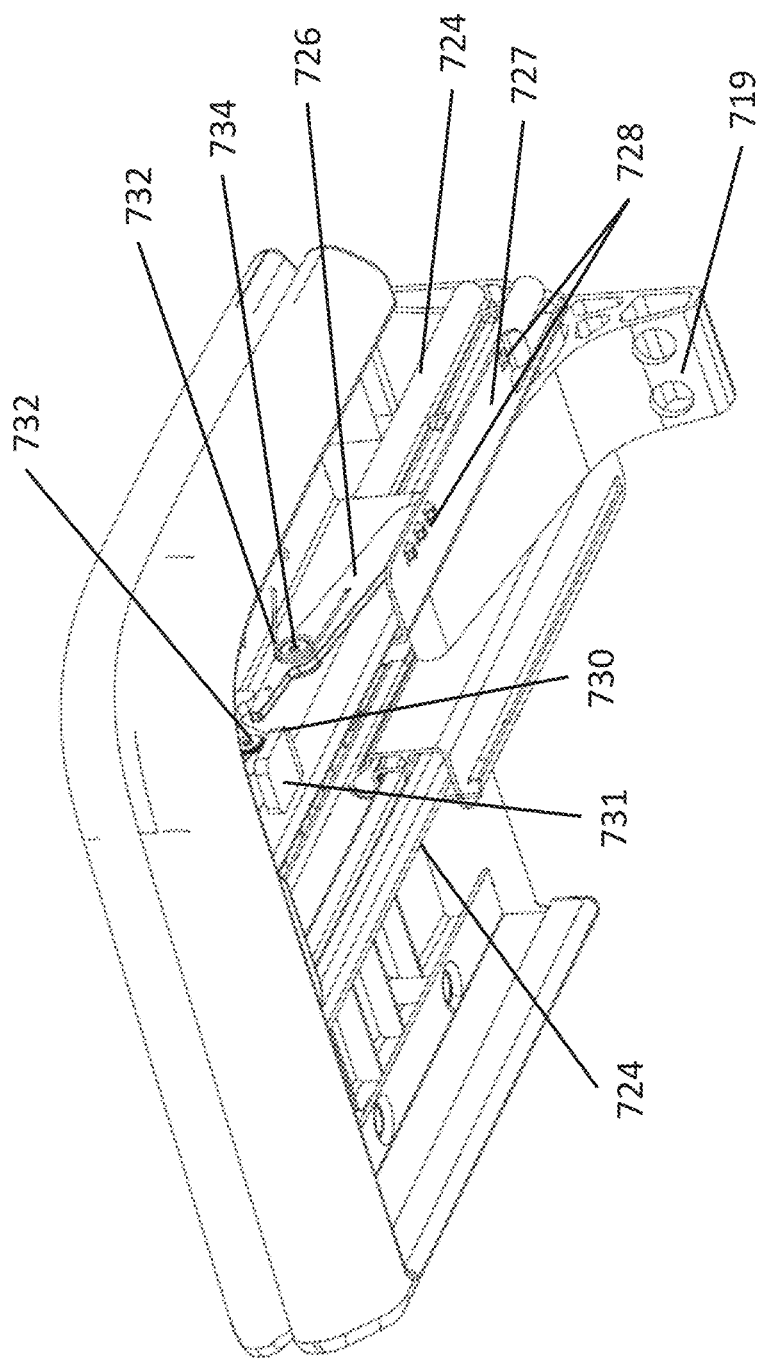
FIG. 7H illustrates a bottom view of a side seat in accordance with embodiments of the invention.

Since various embodiments allow for the side seat to be moved between a stored and a deployed position, it can be appreciated that a number of different methods and/or mechanisms can be employed to move the seat from one position to the other. For example, FIG. 7H illustrates an open bottom view of a side seat base 710. In many embodiments the seat base 710 can be situated on a support element 722 that is connected to one or more rails 724 that can allow for the seat base 710 to slide in and out of the number of different positions. Additionally, many embodiments may incorporate a locking mechanism that can have multiple parts. For example, many embodiments may have a locking lever 726 that is fixed to the seat 710 and moves with the movement of the seat 710. Such embodiments may also incorporate a fixed element 727 that may have a multiple holes 728 that can engage with corresponding teeth on the locking lever. As can be appreciated, the locking mechanism 726 can be activated by an activation device 730 such as a lever with a button or pad 731 that an occupant can engage with. In some embodiments, the activation device 730 can be a push button or any device that can actively engage with the locking mechanism 726 to allow the movement of the locking mechanism. Additionally, both the locking mechanism 726 and the activation device 730 can have one or more resilient members 732 such as a spring that can allow for the respective component to move between an initial and an engagement position. Such resilient member 732 can be positioned around a central pivot point 734 or may be positioned anywhere along the respective component to afford the desired movement and subsequent engagement.

Although a specific configurations of a side facing seat with the various components that allow the movement of such are illustrated, it should be understood that any combination of materials, components, and/or designs can be used in a number of embodiments. For example, some embodiments may use extruded aluminum in the manufacturing of the various structural elements such as the slides or rails 724. Other embodiments may use steel or any other material that may be suitable for the form, fit, and function of the side facing seat. Additionally, some embodiments may use any number of different activation devices and locking mechanisms. For example, some embodiments may us electronic activation devices that can electronically activate a locking mechanism to lock the seat in to position. Such devices can include switches that activate the locking device. Likewise, some embodiments may use locking pins or other type of locking mechanisms rather than a rotating lever. Furthermore, many embodiments may use one or more assistant type devices to help move the seat along the rails. For example, some embodiments may use a hydraulic piston type device and/or a spring or resilient element. Other embodiments can use some type of drive system such as a gear drive and a motor connected to the rails and/or seat base such that the drive system can move the seat base in and out of the various positions as described previously.

The various embodiments described herein illustrate a side facing seat device along with various elements that improve the overall comfort and modularity of side facing seat. While the current disclosure may divide many of the functional and structural elements of side facing seats, it will be understood that any element described, according to embodiments may combine, include or omit any of the described elements as desired by a specific seating design.

Embodiments of Safety Elements

Figure 8:
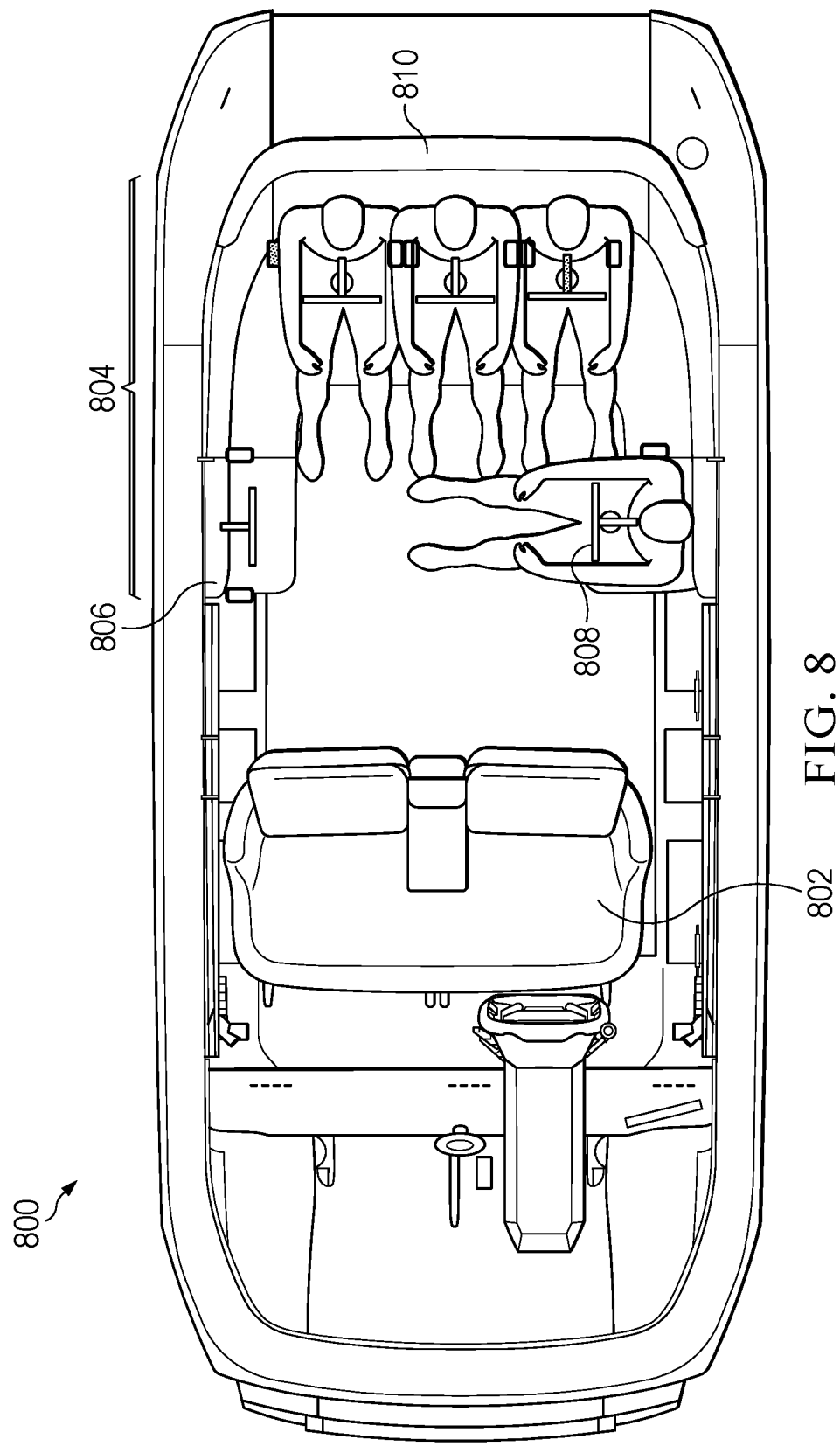
FIG. 8 illustrates a top view of a vehicle seating system in accordance with embodiments of the invention.

As can be readily appreciated, modern vehicles require a substantial number of safety features designed to protect the vehicle occupants in the event of a crash. Previously mentioned were things such as sensors or switches designed to help control the movement of the vehicle. Accordingly, many embodiments of vehicle seating elements described herein can be configured with any number of sensors and or switches that can be connected to a number of different vehicle safety systems to help notify a driver as well as prevent vehicle movement. For example, FIG. 8 illustrates a top view of a vehicle passenger compartment 800 with a front seating system 802 and a rear seating system 804. The rear seating system 804 may be equipped with a side facing seat 806 similar to embodiments previously described. Accordingly, the novel side facing seat 806 may require an occupant detection sensor 808 placed somewhere in the seating element. Occupant detection sensors have been used in many vehicle designs to indicate the use or deactivation of things such as airbags that can help prevent injury to the occupant. Accordingly, side facing seats 806 can use similar sensors to indicate to a driver whether the side facing seat 806 is in an open position and whether or not it is occupied. Furthermore, the driver could be alerted to the activation or inactivation of the safety restraint device. This can help driver's be more aware of occupant positioning before moving the vehicle. Additionally, many sensors and switches can be integrated into a larger vehicle lockout system that can prevent the overall vehicle from moving if occupants are detected but not safely in a position to move. It can be readily appreciated that rear seats 810 can also be equipped with occupant detection sensors 808.

Not only can rear and side seats be equipped with a number of sensors to detect occupants, front seats can take on any number of different configurations that may require a different subset of sensors and/or lockout mechanisms. For example, FIG. 9 illustrates perspective views of front seats 900 with a number of different sensors to help improve occupant safety and/or comfort. For example some embodiments may include occupant position sensors 902 similar to those described in FIG. 8. Other seats 900 may include heating elements 904 that can be activated when the occupant position sensor 902 registers that an occupant is positioned in the seat 900. Additionally, many embodiments can include safety restraint latches 906 that have separate sensors to indicate the use or not of the latch. In many embodiments the rear seat element 908 can be equipped with an occupant detection sensor. The occupant detection sensor can be subsequently connected to an overall vehicle lockout system such that when the rear seat element 908 is opened and/or occupied that the vehicle can be prevented from moving. This can be tied to mechanical locking mechanisms or electrical lockouts that prevent electrical circuits from closing and activating drive systems. Although not illustrated, it can be appreciated that many seating elements can be equipped with one or more additional safety devices such as restraints and/or airbags that can be deployed in a number of ways to protect the occupant.

Figure 10:
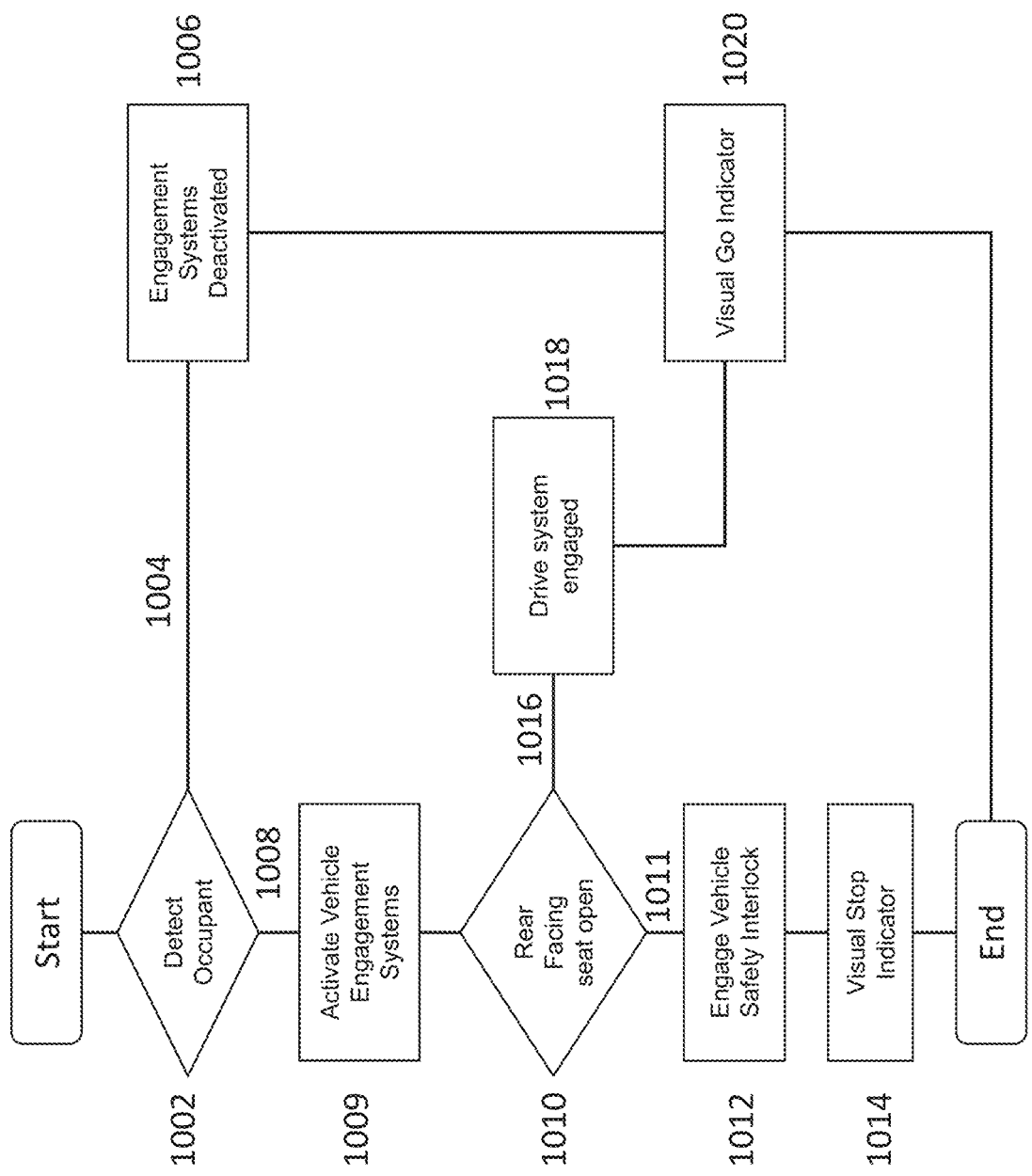
FIG. 10 illustrates a process flow of occupant seating detection systems in accordance with embodiments of the invention.

As can be appreciated with the numerous systems and sensors that can be involved in the various seating systems, FIG. 10 illustrates an embodiment of a system process by which some embodiments may engage a vehicle lockout or notification system. For example, occupant sensors can detect the position of an occupant (1002). If no occupant is detected (1004) then a number of vehicle engagement systems can be deactivated (1006). Some engagement systems can include vehicle lockout systems or driver notification systems. If an occupant is detected (1008) then the various engagement systems can be activated (1009). In some embodiments, the system may look to see if the rear facing seat is activated or placed in an open position (1010). If the rear facing seat is open (1011) then the vehicle safety interlock can be engaged (1012) and prevent the vehicle from moving or engaging the drive system. In addition to the vehicle interlock system, an opened rear facing seat can activate visual indicator (1014) such as an illuminated light or even a notification on a mobile device. Other indicators could include audible indicators that can be used in conjunction with visual indicators to notify the driver that the vehicle interlock system is engaged and the drive system is disengaged. Alternatively, if the rear facing seat is not open (1016) then the interlock system can be prevented from engaging and allow the drive system to engage (1018). Similar to the visual and/or audible indicators for the open position, visual and/or audible go indicators can be activated (1020) to notify the driver that it is safe to operate the vehicle. Although the process is described with respect to the rear facing seat, it should be understood that such processes may be used for other seating elements such as a side facing seat or rear seats according to various embodiments.

The various embodiments described herein illustrate vehicle seating systems and integrated safety systems that can improve the overall comfort and modularity of vehicle seating. While the current disclosure may divide many of the functional, structural, and safety elements of seating systems, it will be understood that any seating element described, according to embodiments may combine, include or omit any of the described elements as desired by a specific vehicle design Summary & Doctrine of Equivalents As can be inferred from the above discussion, the above-mentioned concepts can be implemented in a variety of arrangements in accordance with embodiments of the invention. Specifically, many embodiments include an electric vehicle positioned to take advantage of the potential extra space in such vehicles that do not require bulky internal combustion engines. Accordingly, many embodiments alternative seating arrangements and associated vehicle safety mechanisms. Achieving such functionality, according to embodiments, involves the implementation of special arrangements/designs between subsystems described above, and their equivalents.

Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A side facing seat comprising:
a seat back element; and
a moveable seat base element disposed below the seat back element, wherein the moveable seat base element is moveable at least between a stored position and a seating position, and wherein movement of the moveable seat base element is controlled by an activation element that is configured to engage with a locking mechanism such that the locking mechanism is able to lock the moveable seat base element in the stored position or the seating position;
wherein the seat back element is configured to be connected to an interior face of a vehicle door panel having an exterior face with an internal cavity that (i) is disposed between the interior face and the exterior face and (ii) has an open end on the interior face; and
wherein the moveable seat base element is configured to slide into and out of the internal cavity such that (i) in the stored position, a substantial portion of the moveable seat base element is disposed within the internal cavity and (ii) in the seating position, all of the moveable seat base element is disposed out of the internal cavity.

2. The side facing seat of claim 1, further comprising:
at least one sliding rail connected to a bottom portion of the moveable seat base element such that the movement of the moveable seat base element is a sliding motion between the stored position and the seating position.

3. The side facing seat of claim 2, wherein the side facing seat comprises a plurality of sliding rails.

4. The side facing seat of claim 2, wherein the at least one sliding rail comprises at least one of aluminum, extruded aluminum, or steel.

5. The side facing seat of claim 1, further comprising:
a structural support element disposed beneath the moveable seat base element and configured to be connected to the interior face of the vehicle door panel.

6. The side facing seat of claim 1, wherein the activation element comprises a lever configured to engage with a portion of the locking mechanism such that the activation element is configured to move the locking mechanism between a locked position and an unlocked position.

7. The side facing seat of claim 1, wherein the activation element comprises an electronic activation device electronically connected to the locking mechanism.

8. The side facing seat of claim 1, further comprising:
a movement assist mechanism disposed beneath the moveable seat base element and configured to assist the movement of the moveable seat base element between the stored position and the seating position.

9. The side facing seat of claim 8, wherein the movement assist mechanism comprises a hydraulic piston.

10. A side facing seat comprising:
a seat back element; and
a moveable seat base element disposed below the seat back element, wherein the moveable seat base element is moveable at least between a stored position and a seating position, and wherein movement of the moveable seat base element is controlled by an activation element that is configured to engage with a locking mechanism such that the locking mechanism is able to lock the moveable seat base element in the stored position or the seating position;
wherein the activation element comprises a lever configured to engage with a portion of the locking mechanism such that the activation element is configured to move the locking mechanism between a locked position and an unlocked position;
wherein the side facing seat further comprises first and second resilient members;
wherein the first resilient member is connected to the activation element and is configured to allow movement of the activation element between an active position and an inactive position; and
wherein the second resilient member is connected to the locking mechanism and is configured to allow movement of the locking mechanism between the locked position and the unlocked position.

11. The side facing seat of claim 10, wherein the moveable seat base element is configured to move rotationally between the stored position and the seating position.

12. The side facing seat of claim 10, wherein:
the seat back element is configured to be connected to an interior face of a vehicle door panel having an exterior face with an internal cavity that (i) is disposed between the interior face and the exterior face and (ii) has an open end on the interior face; and
the moveable seat base element is configured to slide into and out of the internal cavity such that (i) in the stored position, a substantial portion of the moveable seat base element is disposed within the internal cavity and (ii) in the seating position, all of the moveable seat base element is disposed out of the internal cavity.

13. A side facing seat comprising:
a seat back element; and
a moveable seat base element disposed below the seat back element, wherein the moveable seat base element is moveable at least between a stored position and a seating position, and wherein movement of the moveable seat base element is controlled by an activation element that is configured to engage with a locking mechanism such that the locking mechanism is able to lock the moveable seat base element in the stored position or the seating position;
wherein the activation element comprises an electronic activation device electronically connected to the locking mechanism; and
wherein the locking mechanism comprises a locking pin device.

14. A side facing seat comprising:
a seat back element;
a moveable seat base element disposed below the seat back element, wherein the moveable seat base element is moveable at least between a stored position and a seating position, and wherein movement of the moveable seat base element is controlled by an activation element that is configured to engage with a locking mechanism such that the locking mechanism is able to lock the moveable seat base element in the stored position or the seating position; and a movement assist mechanism disposed beneath the moveable seat base element and configured to assist the movement of the moveable seat base element between the stored position and the seating position;

wherein the movement assist mechanism comprises a drive gear connected to a drive motor; and wherein the drive motor is configured to drive the drive gear between the stored position and the seating position.

15. A system comprising:

an electric vehicle; and a side facing seat within the electric vehicle, the side facing seat comprising:
- a seat back element; and
- a moveable seat base element disposed below the seat back element, wherein the moveable seat base element is moveable at least between a stored position and a seating position, and wherein movement of the moveable seat base element is controlled by an activation element that is configured to engage with a locking mechanism such that the locking mechanism is able to lock the moveable seat base element in the stored position or the seating position;

wherein the seat back element is connected to an interior face of a door panel of the electric vehicle, the door panel having an exterior face with an internal cavity that is disposed between the interior face and the exterior face, the internal cavity having an open end on the interior face; and wherein the moveable seat base element is configured to slide into and out of the internal cavity such that (i) in the stored position, a substantial portion of the moveable seat base element is disposed within the internal cavity and (ii) in the seating position, all of the moveable seat base element is disposed out of the internal cavity.

16. The system of claim 15, wherein the side facing seat further comprises at least one sliding rail connected to a bottom portion of the moveable seat base element such that the movement of the moveable seat base element is a sliding motion between the stored position and the seating position.

17. The system of claim 15, wherein:

the electric vehicle further comprises a rear seat;

the moveable seat base element is moveable between the stored position, the seating position, and a design position; and in the design position, a front face of the moveable seat base element is continuous with a front face of the rear seat.

18. The system of claim 15, wherein the activation element comprises a lever configured to engage with a portion of the locking mechanism such that the activation element is configured to move the locking mechanism between a locked position and an unlocked position.

19. The system of claim 18, wherein:

the side facing seat further comprises first and second resilient members;

the first resilient member is connected to the activation element and is configured to allow movement of the activation element between an active position and an inactive position; and the second resilient member is connected to the locking mechanism and is configured to allow movement of the locking mechanism between the locked position and the unlocked position.

20. The system of claim 15, wherein the activation element comprises an electronic activation device electronically connected to the locking mechanism.

21. The system of claim 20, wherein the locking mechanism comprises a locking pin device.

22. The system of claim 15, wherein the side facing seat further comprises a movement assist mechanism disposed beneath the moveable seat base element and configured to assist the movement of the moveable seat base element between the stored position and the seating position.

23. The system of claim 22, wherein the movement assist mechanism comprises a hydraulic piston.

24. The system of claim 22, wherein:

the movement assist mechanism comprises a drive gear connected to a drive motor; and the drive motor is configured to drive the drive gear between the stored position and the seating position.

* * * * *